US012265938B2

United States Patent
Graf et al.

(10) Patent No.: US 12,265,938 B2
(45) Date of Patent: Apr. 1, 2025

(54) SYSTEMS AND METHODS RELATING TO EVALUATING AND MEASURING AN EXPERIENCE USING AN EXPERIENCE INDEX

(71) Applicant: GENESYS CLOUD SERVICES, INC., Menlo Park, CA (US)

(72) Inventors: Peter Graf, Menlo Park, CA (US);
James Z. Xiao, Menlo Park, CA (US);
Anthony Bates, Menlo Park, CA (US);
Christina Linzy, Menlo Park, CA (US);
Nathan Mayer, Menlo Park, CA (US)

(73) Assignee: Genesys Cloud Services, Inc., Menlo Park, CA (US)

( * ) Notice: Subject to any disclaimer, the term of this patent is extended or adjusted under 35 U.S.C. 154(b) by 204 days.

(21) Appl. No.: 17/890,952

(22) Filed: Aug. 18, 2022

(65) Prior Publication Data

US 2023/0058543 A1 Feb. 23, 2023

Related U.S. Application Data

(60) Provisional application No. 63/234,525, filed on Aug. 18, 2021.

(51) Int. Cl.
*G06Q 10/0639* (2023.01)
*G06Q 30/0203* (2023.01)

(52) U.S. Cl.
CPC . *G06Q 10/06393* (2013.01); *G06Q 10/06395* (2013.01); *G06Q 30/0203* (2013.01)

(58) Field of Classification Search
None
See application file for complete search history.

(56) References Cited

U.S. PATENT DOCUMENTS 6,513,014 B1 * 1/2003 Walker ............ H04N 21/25891
705/7.33
2002/0128898 A1 * 9/2002 Smith, Jr. .......... G06Q 30/0203
705/7.32

(Continued)

FOREIGN PATENT DOCUMENTS

WO     WO-0142873 A2 *  6/2001     ............ G06Q 30/02
WO     20060047595 A2   5/2006
WO     WO-2014071776 A1 * 5/2014    ......... H04L 41/5009

OTHER PUBLICATIONS

Olivier"AnOverviewoftheSurveyofConsumerExpectations" Nov. 2016,Federal Reserve Bank of New York, Staff Reports,No. 800, pp. 1-30 (Year: 2016).*

(Continued)

*Primary Examiner* — Romain Jeanty
(74) *Attorney, Agent, or Firm* — Taft Stettinius & Hollister LLP

(57) ABSTRACT

A method for measuring experience quality. The method including: receiving key experience aspects ("KEAs"); administering pre-surveys to a representative subset of the experience audience, including an importance pre-survey requesting relative importance between the KEAs; and perception pre-survey requesting how closely perceptions align with each KEAs; calculating importance weights and perception weights based on the pre-surveys; performing a general survey process that includes surveying the experience audience to provide a quality rating indicating how well each of the KEAs was delivered based on their own experience; and calculating an Experience Index score as a measure of the quality of the experience that is an aggregation of the received quality ratings weighted by at least one of the importance weights or the perception weights.

27 Claims, 13 Drawing Sheets

(56) References Cited

U.S. PATENT DOCUMENTS

| | | | |
|---|---|---|---|
| 2009/0228337 A1* | 9/2009 | Swindon | G06Q 10/10 |
| | | | 705/7.32 |
| 2012/0317627 A1* | 12/2012 | Chandrashekhar | ........................ |
| | | | H04L 63/1433 |
| | | | 726/4 |
| 2013/0159498 A1* | 6/2013 | Funge | H04N 21/44218 |
| | | | 709/224 |
| 2015/0324821 A1* | 11/2015 | Rincon | G06Q 30/0203 |
| | | | 705/7.33 |
| 2015/0348070 A1* | 12/2015 | Boettcher | G06Q 30/0203 |
| | | | 705/7.32 |
| 2016/0034930 A1 | 2/2016 | Verschoor | |
| 2019/0188645 A1* | 6/2019 | Monasor | G06Q 10/1053 |
| 2019/0377996 A1* | 12/2019 | Cha | G06N 3/004 |
| 2020/0074294 A1 | 3/2020 | Long | |
| 2021/0241327 A1 | 8/2021 | Childress | |

OTHER PUBLICATIONS

Victoria et al "Evaluating Audience Engagement of an Immersive audience Engagement of an Immersive Performance on a Virtual Stage", Jun. 2021, Frameless, pp. 1-15 (Year: 2020).*
Nitish "A Practical Guide to Customer Experience Measurement", Aug. 2017, Ameyo, pp. 1-9 (Year: 2017).*
International Search Report and Written Opinion received for co-pending PCT application having application No. PCT/US2022/040795 mailed on Dec. 9, 2022.

\* cited by examiner

| 400 Respondent Index - m | KEA₁ | KEA₂ | KEA₃ | KEA₄ | KEA₅ |
|---|---|---|---|---|---|
| Response 1 | 0.33 | 0.27 | 0.20 | 0.13 | 0.07 |
| Response 2 | 0.27 | 0.33 | 0.20 | 0.07 | 0.13 |
| Response 3 | 0.27 | 0.20 | 0.07 | 0.33 | 0.13 |
| Response 4 | 0.27 | 0.13 | 0.20 | 0.33 | 0.07 |
| Response 5 | 0.27 | 0.07 | 0.13 | 0.33 | 0.20 |
| Weight | 0.28 | 0.2 | 0.16 | 0.24 | 0.12 |

KEA Importance Weighting Index

FIG. 4

KEA Perceptions Weighting Index

| | KEA$_1$ | | | KEA$_2$ | | | KEA$_3$ | | | KEA$_4$ | | | KEA$_5$ | | |
|---|---|---|---|---|---|---|---|---|---|---|---|---|---|---|---|
| | E$_1$ | E$_2$ | E$_3$ | E$_1$ | E$_2$ | E$_3$ | E$_1$ | E$_2$ | E$_3$ | E$_1$ | E$_2$ | E$_3$ | E$_1$ | E$_2$ | E$_3$ |
| 1 | 1 | 0 | 0 | 0 | 1 | 0 | 1 | 0 | 0 | 0 | 0 | 1 | 1 | 0 | 0 |
| 2 | 1 | 0 | 0 | 0 | 1 | 0 | 0 | 1 | 0 | 0 | 0 | 1 | 1 | 0 | 0 |
| 3 | 1 | 0 | 0 | 0 | 1 | 0 | 0 | 1 | 0 | 0 | 0 | 1 | 1 | 0 | 0 |
| 4 | 1 | 0 | 0 | 1 | 0 | 0 | 0 | 1 | 0 | 0 | 0 | 1 | 0 | 1 | 0 |
| 5 | 0 | 1 | 0 | 0 | 1 | 0 | 1 | 0 | 0 | 1 | 0 | 0 | 1 | 0 | 0.2 |
| Weight | 0.8 | 0.2 | 0 | 0.2 | 0.8 | 0 | 0.4 | 0.6 | 0 | 0.2 | 0 | 0.8 | 0.8 | 0 | 0.2 |

500

- Respondent Index - m
- E1   Experience Weight - Efficiency
- E2   Experience Weight - Effectiveness
- E3   Experience Weight - Empathy

FIG. 5

| Experience Index 600 | $\omega_n$ | $s_n$ | $s_{max}$ | $\omega_n s_n$ | $\omega_n s_{max}$ |
|---|---|---|---|---|---|
| KEA$_1$ | 0.28 | 4 | 4 | 1.12 | 1.12 |
| KEA$_2$ | 0.20 | 3 | 4 | 0.6 | 0.8 |
| KEA$_3$ | 0.16 | 1 | 4 | 0.16 | 0.64 |
| KEA$_4$ | 0.24 | 2 | 4 | 0.48 | 0.96 |
| KEA$_5$ | 0.12 | 2 | 4 | 0.24 | 0.48 |
| | | | sum | 2.6 | 4.0 |
| | | | XI score = | 0.65 | |

FIG. 6

| Perception Experience Index 700 | $\omega_n$ | $\epsilon_{n,1}$ | $s_n$ | $s_{max}$ | $\omega_n \epsilon_{n,1} s_n$ | $\omega_n \epsilon_{n,1} s_{max}$ |
|---|---|---|---|---|---|---|
| KEA$_1$ | 0.28 | 0.8 | 4 | 4 | 0.896 | 0.896 |
| KEA$_2$ | 0.20 | 0.2 | 3 | 4 | 0.12 | 0.16 |
| KEA$_3$ | 0.14 | 0.4 | 1 | 4 | 0.056 | 0.224 |
| KEA$_4$ | 0.24 | 0.2 | 2 | 4 | 0.096 | 0.192 |
| KEA$_5$ | 0.14 | 0.8 | 2 | 4 | 0.224 | 0.448 |
| | | | | sum | 1.392 | 1.92 |
| | | | | PXI score = | 0.725 | |

FIG. 7

Please sort these aspects of your work experience by how important they are to you!
*(Put the most important aspect at the top, the least important at the bottom)*

My immediate manager cares about me as a person.

My company provides an atmosphere where I can be my authentic self at work.

I am accepted by my immediate coworkers.                                    900

I am confident that my company's leadership (VP+) will lead the company to future success.

I see professional growth and career development opportunities for myself at my company.

FIG. 9

| Key Experience Aspects                                                      1000 | Importance Weights |
|---|---|
| My immediate manager cares about me as a person. | 27.4% |
| My company provides an atmosphere where I can be my authentic self. | 19.1% |
| I am accepted by my immediate coworkers. | 16.7% |
| I am confident that leadership will lead the company to future success. | 21.0% |
| I see professional growth and career dev. opportunities for myself. | 15.9% |

FIG. 10

| 1100 | Please indicate what you think of an employee experience that delivers on the following aspects! | | |
|---|---|---|---|
| | ...then the experience is _empathetic_ (it makes me feel heard and understood) | ...then the experience is _effective_ (it helps drive expected outcomes) | ...then the experience is _efficient_ (it does not waste time or effort) |
| If my immediate manager cares about me as a person... | ○ | ○ | ○ |
| If my company provides an atmosphere where I can be my authentic self at work... | ○ | ○ | ○ |

FIG. 11

| Key Experience Aspects  1200 | Perception Weights | | |
|---|---|---|---|
| | Efficiency | Effectiveness | Empathy |
| My immediate manager cares about me as a person. | 1.5% | 6.8% | 19.6% |
| My company provides an atmosphere where I can be my authentic self. | 5.5% | 3.8% | 11.0% |
| I am accepted by my immediate coworkers. | 2.2% | 15.1% | 2.7% |
| I am confident that leadership will lead the company to future success. | 4.5% | 7.1% | 7.1% |
| I see professional growth and career dev. opportunities for myself. | 2.5% | 1.4% | 9.3% |

FIG. 12

| Please rate how the company met your employee experience expectations: | | | | | |
|---|---|---|---|---|---|
| 1300 | Strongly Disagree | Disagree | Neutral | Agree | Strongly Agree |
| My immediate manager cares about me as a person. | ○ | ○ | ○ | ○ | ○ |
| ...then the experience is empathetic (it makes me feel heard and understood) | ○ | ○ | ○ | ○ | ○ |

SYSTEMS AND METHODS RELATING TO EVALUATING AND MEASURING AN EXPERIENCE USING AN EXPERIENCE INDEX

CROSS REFERENCE TO RELATED APPLICATION

This application claims the benefit of U.S. Provisional Patent Application No. 63/234,525, titled "SYSTEMS AND METHODS RELATING TO EVALUATING CUSTOMER EXPERIENCE USING AN EXPERIENCE INDEX", filed in the U.S. Patent and Trademark Office on Aug. 18, 2021, the contents of which are incorporated herein.

BACKGROUND

The present invention generally relates to the technologies for measuring and evaluating an experience. More particularly, but not by way of limitation, the present invention relates to information technologies and the in the field of experience orchestration, including the evaluation, measurement, and optimization of the customer experiences, employee experiences, and the experiences of other stakeholders associated with a business or other organization.

BRIEF DESCRIPTION OF THE INVENTION

The present invention includes a computer-implemented method facilitating the measuring and enhancement of the quality of an experience. The experience may be provided by an experience provider and experienced by an experience audience. The method may include the step of receiving and storing key experience aspects ("KEAs") for the experience. Each of the KEAs may include a statement describing a key aspect of the experience. The method may include the step of performing a pre-survey process to develop an understanding of the experience. The pre-survey process may include administering electronically a set of pre-surveys. Each pre-survey of the set of pre-surveys may be administered to respondents in a representative subset of the experience audience. The set of pre-surveys may include at least: an importance pre-survey that requests each respondent to respond by indicating a relative importance between the KEAs; and a perception pre-survey that requests each respondent to respond by indicating which from among a plurality of predetermined perceptions most closely aligns with each of the KEAs. The method may further include the step of calculating, based on responses received during the administering of the set of pre-surveys, one or more weights. The one or more weights may include importance weights based on responses received to the importance pre-survey. The importance weights may be a weighting between the KEAs by relative importance. The weights may include perception weights based on responses received to the perception pre-survey. The perception weights may include a weighting between the KEAs by relative strength of an alignment with a given perception of the plurality of predetermined perceptions. The method may further include the step of performing a general survey process that includes administering electronically a general survey to an entirety of the experience audience. The general survey may request each respondent to provide a quality rating indicating how well each of the KEAs has been delivered based on their own experience of the experience. The method may further include the step of calculating, based on responses received during the administering of the general survey, an Experience Index score as a measure of the quality of the experience. The Experience Index score may be an aggregation of the received quality ratings weighted by at least one of the importance weights or the perception weights.

These and other features of the present application will become more apparent upon review of the following detailed description of the example embodiments when taken in conjunction with the drawings and the appended claims.

BRIEF DESCRIPTION OF THE DRAWINGS

A more complete appreciation of the present invention will become more readily apparent as the invention becomes better understood by reference to the following detailed description when considered in conjunction with the accompanying drawings, in which like reference symbols indicate like components. The drawings include the following figures.

FIG. 4 is an exemplary Key Experience Aspect ("KEA") Importance Weighting Index according to embodiments of the present invention.

FIG. 5 is an exemplary KEA Perception Weighting Index according to embodiments of the present invention.

FIG. 6 is an exemplary Experience Index according to embodiments of the present invention.

FIG. 7 is an exemplary Perception Experience Index according to embodiments of the present invention.

FIG. 9 is an exemplary user interface for ranking KEAs according to embodiments of the present invention.

FIG. 10 shows the importance weights calculated in an exemplary implementation of the Experience Index Methodology.

FIG. 11 is an exemplary user interface choosing a perception related to a KEA.

FIG. 12 shows the perception weights calculated in an exemplary implementation of the Experience Index Methodology.

DETAILED DESCRIPTION

Figure 1:
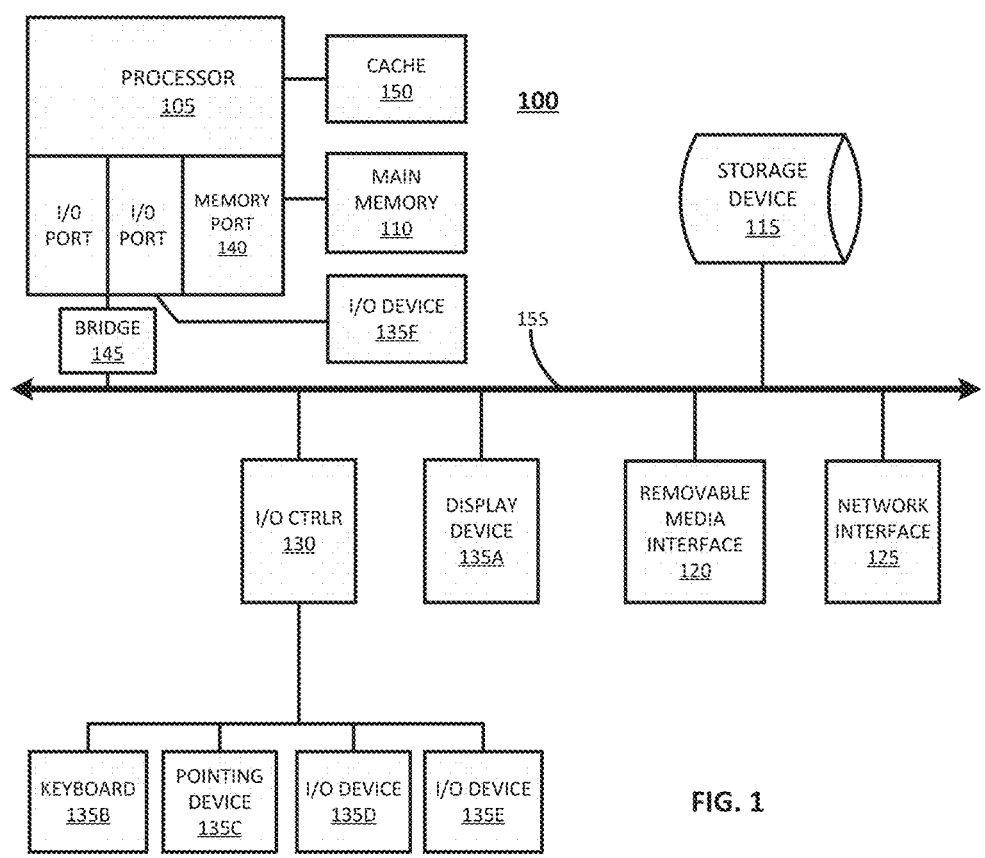
FIG. 1 depicts a schematic block diagram of a computing device in accordance with exemplary embodiments of the present invention and/or with which exemplary embodiments of the present invention may be enabled or practiced.

For the purposes of promoting an understanding of the principles of the invention, reference will now be made to the exemplary embodiments illustrated in the drawings and specific language will be used to describe the same. It will be apparent, however, to one having ordinary skill in the art that the detailed material provided in the examples may not be needed to practice the present invention. In other instances, well-known materials or methods have not been described in detail in order to avoid obscuring the present invention. As used herein, language designating nonlimiting examples and illustrations includes "e.g.", "i.e.", "for example", "for instance" and the like. Further, reference throughout this specification to "an embodiment", "one embodiment", "present embodiments", "exemplary embodiments", "certain embodiments" and the like means that a particular feature, structure, or characteristic described in connection with the given example may be included in at least one embodiment of the present invention. Particular features, structures or characteristics may be combined in any suitable combinations and/or sub-combinations in one or more embodiments or examples. Those skilled in the art will recognize from the present disclosure that the various embodiments may be computer implemented using many different types of data processing equipment, with embodiments being implemented as an apparatus, method, or computer program product.

The flowcharts and block diagrams provided in the figures illustrate architecture, functionality, and operation of possible implementations of systems, methods, and computer program products in accordance with example embodiments of the present invention. In this regard, it will be understood that each block of the flowcharts and/or block diagrams—or combinations of those blocks—may represent a module, segment, or portion of program code having one or more executable instructions for implementing the specified logical functions. It will similarly be understood that each of block of the flowcharts and/or block diagrams—or combinations of those blocks—may be implemented by special purpose hardware-based systems or combinations of special purpose hardware and computer instructions performing the specified acts or functions. Such computer program instructions also may be stored in a computer-readable medium that can direct a computer or other programmable data processing apparatus to function in a particular manner, such that the program instructions in the computer-readable medium produces an article of manufacture that includes instructions by which the functions or acts specified in each block of the flowcharts and/or block diagrams—or combinations of those blocks—are implemented.

Introduction

A new people-centric approach being taken by businesses has given rise to what has commonly become known as the "experience economy". In the experience economy, the experience of the people interacting with a business—for example, customers, employees, business partners, or other stakeholder—becomes the focus. As a result, the traditional "inside out" perspective in optimizing a business is no longer sufficient, as the singular focus on the efficiency and effectiveness of a company's operations often negatively impacts experiences of those associated with it. Modern companies, thus, are increasingly adopting an "outside in", empathy-driven approach, which puts the experience of customers, employees, and business partners at the forefront of every business consideration. In a world where the competition is a mere click away, the trust and loyalty created by superior, empathetic experiences is the best protection from competitive displacement and a pre-requisite for future growth. This focus on experience has increased the importance of empathy in business.

A significant consequence of these developments is that businesses and other organizations need a better way to measure the quality of an experience (or "experience quality"). As will be appreciated, this is necessary if businesses are to improve or optimize the experiences they provide. As with any optimization problem, it is first necessary to accurately measure what is being optimized. As disclosed herein, the present invention proposes a particular methodology—which will be referred to as an "Experience Index Methodology"—as that needed tool for measuring experience. As will be seen, the Experience Index Methodology meets the needs of the experience economy and allows business to optimize the experiences they provided.

Before proceeding with a detailed introduction to the Experience Index Methodology, an exemplary computing device and contact center system will be discussed in relation to FIGS. 1 and 2, respectively. As will be understood by one of ordinary skill in the art, the contact center system of FIG. 2 is provided as an exemplary environment in which aspects of the Experience Index Methodology could be readily implemented. For example, the Experience Index Methodology could be used to measure the experiences of employees and customers of a contact center and provide analysis as to how those experiences could be improved or optimized. It should be further understood, however, that the Experience Index Methodology is not limited to such use and that, unless expressly limited herein, may be similarly applied to other businesses and organizations to measure the experience of any associated stakeholder in much the same way and by using analogous systems and other technologies as those disclosed herein.

Figure 2:
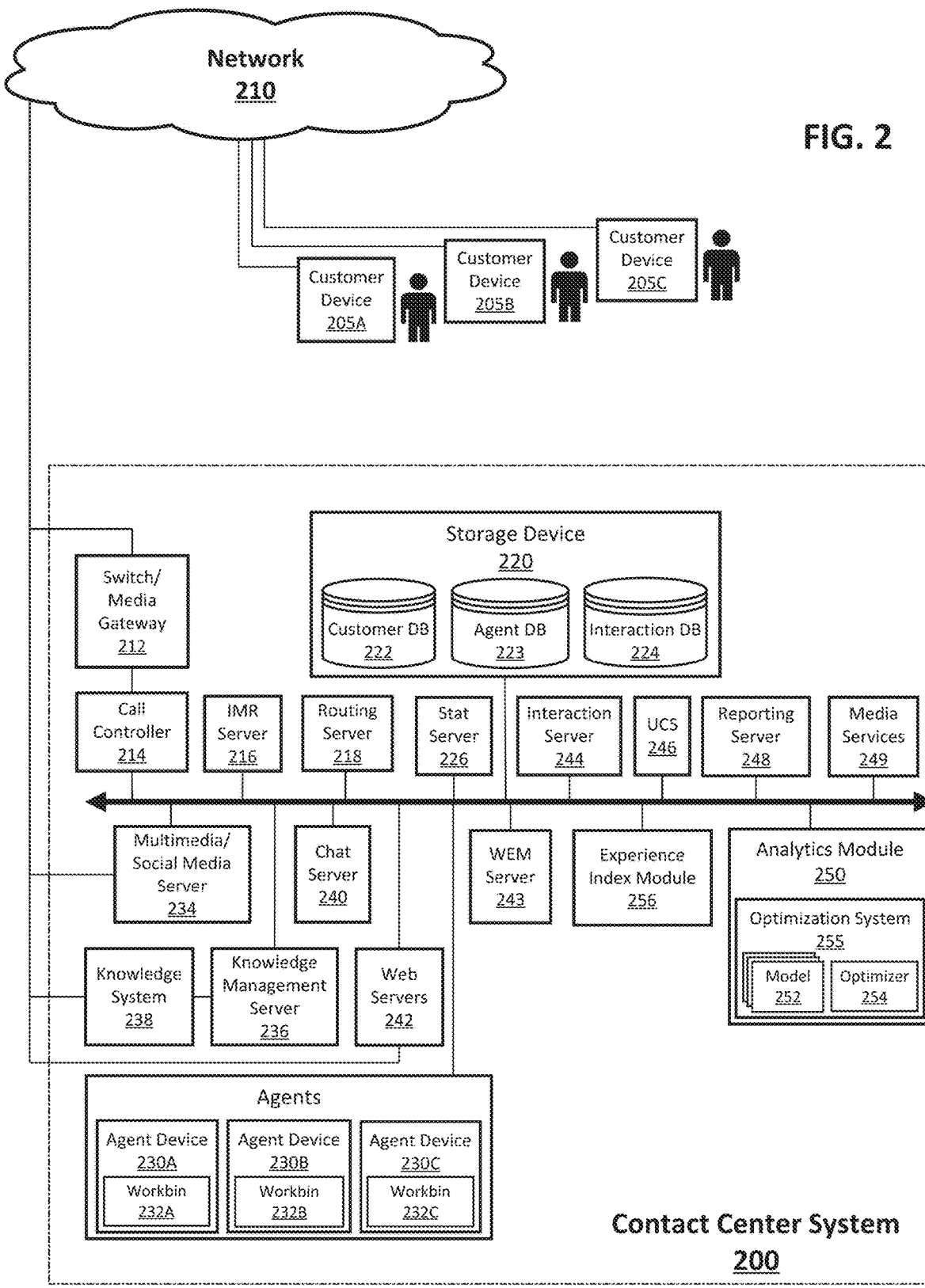
FIG. 2 depicts a schematic block diagram of a communications infrastructure or contact center in accordance with exemplary embodiments of the present invention and/or with which exemplary embodiments of the present invention may be enabled or practiced.

Accordingly, the following description related to FIGS. 1 and 2 is meant to provide general discussion regarding enabling technology as well as background information on contact center systems and the operation thereof. It should be appreciated that specific discussion of the Experience Index Methodology continues in the description below related to FIGS. 3 through 18, where the manner of its implementation in similar and analogous environments will be provided.

Computing Device

The systems and methods of the present invention may be computer implemented using many different forms of data processing equipment, for example, digital microprocessors and associated memory, executing appropriate software programs. By way of background, FIG. 1 illustrates a schematic block diagram of an exemplary computing device 100 in accordance with embodiments of the present invention and/or with which those embodiments may be enabled or practiced. It should be understood that FIG. 1 is provided as a non-limiting example.

The computing device 100, for example, may be implemented via firmware (e.g., an application-specific integrated circuit), hardware, or a combination of software, firmware, and hardware. It will be appreciated that each of the servers, controllers, switches, gateways, engines, and/or modules in the following figures (which collectively may be referred to as servers or modules) may be implemented via one or more of the computing devices 100. As an example, the various servers may be a process running on one or more processors of one or more computing devices 100, which may be executing computer program instructions and interacting with other systems or modules in order to perform the various functionalities described herein. Unless otherwise specifically limited, the functionality described in relation to a plurality of computing devices may be integrated into a single computing device, or the various functionalities described in relation to a single computing device may be distributed across several computing devices. Further, in relation to any of the computing systems described herein, the various servers and computer devices may be located on computing devices 100 that are local (i.e., on-site) or remote (i.e., off-site or in a cloud computing environment), or some combination thereof.

As shown in the illustrated example, the computing device 100 may include a central processing unit or processor 105 and a main memory 110. The computing device 100 may also include a storage device 115, removable media interface 120, network interface 125, I/O controller 130, and one or more input/output devices 135, which as depicted may include an, display device 135A, keyboard 135B, and pointing device 135C. The computing device 100 further may include additional elements, such as a memory port 140, a bridge 145, I/O ports, one or more additional input/output devices 135D, 135E, 135F, and a cache memory 150 in communication with the processor 105.

The processor 105 may be any logic circuitry that processes instructions fetched from the main memory 110. For example, the process 105 may be implemented by an integrated circuit, e.g., a microprocessor, microcontroller, or graphics processing unit, or in a field-programmable gate array or application-specific integrated circuit. As depicted, the processor 105 may communicate directly with the cache memory 150 via a secondary bus or backside bus. The main memory 110 may be one or more memory chips capable of storing data and allowing stored data to be directly accessed by the central processing unit 105. The storage device 115 may provide storage for an operating system. Unless otherwise limited, the computing device 100 may include an operating system and software capable of performing the functionality described herein.

As depicted in the illustrated example, the computing device 100 may include a wide variety of I/O devices 135, one or more of which may be connected via the I/O controller 130. Input devices, for example, may include a keyboard 135B and a pointing device 135C, e.g., a mouse or optical pen. Output devices, for example, may include video display devices, speakers, and printers. The computing device 100 may also support one or more removable media interfaces 120. More generally, the I/O devices 135 may include any conventional devices for performing the functionality described herein.

Unless otherwise restricted, the computing device 100 may be any workstation, desktop computer, laptop or notebook computer, server machine, virtualized machine, mobile or smart phone, portable telecommunication device, or any other type of computing device, without limitation, capable of performing the functionality described herein. The computing device 100 may include a plurality of devices and resources connected by a network. As used herein, a network includes one or more computing devices, machines, clients, client nodes, client machines, client computers, endpoints, or endpoint nodes in communication with one or more other such devices. The network may be a private or public switched telephone network, wireless carrier network, local area network, private wide area network, public wide area network, such as the Internet, etc., with connections being established using communication protocols. More generally, it should be understood that, unless otherwise limited, the computing device 100 may communicate with other computing devices 100 via any type of network using any communication protocol. Further, the network may be a virtual network environment where various network components are virtualized.

Contact Center

With reference now to FIG. 2, a communications infrastructure or contact center system 200 is shown in accordance with exemplary embodiments of the present invention and/or with which exemplary embodiments of the present invention may be enabled or practiced. The term "contact center system" may be used herein to refer to the system depicted in FIG. 2 and/or the components thereof, while the term "contact center" may be used more generally to the business or function providing customer service.

By way of background, customer service providers generally offer many types of services through contact centers. Such contact centers may be staffed with employees or customer service agents (or simply "agents"), with the agents serving as an interface between a company, enterprise, government agency, or organization (hereinafter referred to interchangeably as an "organization" or "enterprise") and persons, such as users, individuals, or customers (hereinafter referred to interchangeably as "individuals" or "customers"). For example, the agents at a contact center may receive customer orders, solve customer problems with products or services already received, or assist customers in making purchasing decisions. Within a contact center, such interactions between contact center agents and outside entities or customers may be conducted over a variety of communication channels, such as, for example, via voice (e.g., telephone calls or voice over IP or VoIP calls), video (e.g., video conferencing), text (e.g., emails and text chat), screen sharing, co-browsing, or the like.

Referring specifically to FIG. 2, contact centers generally strive to provide quality services to customers while minimizing efficiency. Contact centers may include many different systems and modules—such as those shown in exemplary contact center system 200—in furtherance of this aim. The contact center system 200 may engage and manage interactions and communications with customers via human agents and/or automated processes (or "bots"). As should be understood, the contact center system 200 may be an in-house facility to a business or enterprise for performing the functions of sales and customer service. In another aspect, the contact center system 200 may be operated by a third-party service provider that contracts to provide services for another organization. Further, the contact center system 200 may be deployed on equipment dedicated to the enterprise or third-party service provider, and/or deployed in a remote computing environment such as, for example, a private or public cloud environment. The contact center system 200 may include software applications executed on premises and/or remotely. The various components of the contact center system 200, thus, may be distributed across various geographic locations and/or housed locally.

Unless otherwise specifically limited, any of the computing elements of the present invention may be implemented in cloud-based or cloud computing environments. As used herein, "cloud computing"—or, simply, the "cloud"—is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. Cloud computing can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS")), and deployment models (e.g., private cloud, community cloud, public cloud, hybrid cloud, etc.). Often referred to as a "serverless architecture", a cloud execution model generally includes a service provider dynamically managing an allocation and provisioning of remote servers for achieving a desired functionality.

In accordance with FIG. 2, the components or modules of the contact center system 200 may include: a plurality of customer devices 205A, 205B, 205C; communications network (or simply "network") 210; switch/media gateway 212; call controller 214; interactive media response ("IMR") server 216; routing server 218; storage device 220; statistics (or "stat") server 226; plurality of agent devices 230A, 230B, 230C that include workbins 232A, 232B, 232C, respectively; multimedia/social media server 234; knowledge management server 236 coupled to a knowledge system 238; chat server 240; web servers 242; workforce engagement management ("WEM") server 243; interaction server 244; universal contact server (or "UCS") 246; reporting server 248; media services server 249; an analytics module 250; and an Experience Index module (or "XI module") 256. Any of the computer-implemented components, modules, or servers described in relation to FIG. 2 or in any of the following figures may be implemented via any type of computing devices, including the example computing device 100 of FIG. 1. As will be seen, the contact center system 200 generally manages resources (e.g., personnel, computers, telecommunication equipment, etc.) to enable delivery of services via telephone, email, chat, or other communication mechanisms. Such services may vary depending on the type of contact center and, for example, may include customer service, help desk functionality, emergency response, telemarketing, order taking, and the like.

Customers desiring to receive services from the contact center system 200 may initiate inbound communications (e.g., telephone calls, emails, chats, etc.) to the contact center system 200 via a customer device 205. While FIG. 2 shows three such customer devices—i.e., customer devices 205A, 205B, and 205C—any number may be present. The customer devices 205, for example, may be a communication device, such as a telephone, smart phone, computer, tablet, or laptop. In accordance with functionality described herein, customers may generally use the customer devices 205 to initiate, manage, and conduct communications with the contact center system 200, such as telephone calls, emails, chats, text messages, and the like.

Inbound and outbound communications from and to the customer devices 205 may traverse the network 210, with the nature of network typically depending on the type of customer device being used and form of communication. As an example, the network 210 may include a communication network of telephone, cellular, and/or data services. The network 210 may be a private or public switched telephone network (PSTN), local area network (LAN), private wide area network (WAN), and/or public WAN such as the Internet. Further, the network 210 may include any wireless carrier network.

In regard to the switch/media gateway 212, it may be coupled to the network 210 for receiving and transmitting telephone calls between customers and the contact center system 200. The switch/media gateway 212 may include a telephone or communication switch configured to function as a central switch for agent level routing within the center. The switch may be a hardware switching system or implemented via software. For example, the switch 215 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, one of the agent devices 230. Thus, in general, the switch/media gateway 212 establishes a voice connection between the customer and the agent by establishing a connection between the customer device 205 and agent device 230. As further shown, the switch/media gateway 212 may be coupled to the call controller 214 which, for example, serves as an adapter or interface between the switch and the other routing, monitoring, and communication-handling components of the contact center system 200. The call controller 214 may be configured to process PSTN calls, VoIP calls, etc. For example, the call controller 214 may include computer-telephone integration software for interfacing with the switch/media gateway and other components. The call controller 214 may include a session initiation protocol (SIP) server for processing SIP calls. The call controller 214 may also extract data about an incoming interaction, such as the customer's telephone number, IP address, or email address, and then communicate these with other contact center components in processing the interaction.

In regard to the interactive media response (IMR) server 216, it may be configured to enable self-help or virtual assistant functionality. Specifically, the IMR server 216 may be similar to an interactive voice response ("IVR") server, except that the IMR server 216 is not restricted to voice and may also cover a variety of media channels. In an example illustrating voice, the IMR server 216 may be configured with an IMR script for querying customers on their needs. For example, a contact center for a bank may tell customers via the IMR script to "press 1" if they wish to retrieve their account balance. Through continued interaction with the IMR server 216, customers may receive service without needing to speak with an agent. The IMR server 216 may also be configured to ascertain why a customer is contacting the contact center so that the communication may be routed to the appropriate resource.

In regard to the router or routing server 218, it may function to route incoming interactions. The routing server 218 may perform predictive routing whereby incoming interactions are routed to resources calculated to deliver the best result for the customer and/or contact center. For example, functionality within the routing server 218 may select the most appropriate agent and route the communication thereto. The agent selection may be based on which available agent is best suited for handling the communication. More specifically, the selection of appropriate agent may be based on a routing strategy or algorithm that is implemented by the routing server 218. In doing this, the routing server 218 may query data that is relevant to the incoming interaction, for example, data relating to the particular customer, available agents, and the type of interaction, which, as described more below, may be stored in particular databases. Once the agent is selected, the routing server 218 may interact with the call controller 214 to route (i.e., connect) the incoming interaction to the corresponding agent device 230. As part of this connection, information about the customer may be provided to the selected agent via their agent device 230. This information is intended to enhance the service the agent provides to the customer.

Regarding data storage, the contact center system 200 may include one or more mass storage devices—represented generally by the storage device 220—for storing data relevant to the functioning of the contact center. For example, the storage device 220 may store customer data that is maintained in a customer database 222. Such customer data may include customer profiles, contact information, service level agreement, and interaction history (e.g., details of previous interactions with a particular customer, including the nature of previous interactions, disposition data, wait time, handle time, and actions taken by the contact center to resolve customer issues). As another example, the storage device 220 may store agent data in an agent database 223. Agent data maintained by the contact center system 200 may include agent availability and agent profiles, schedules, skills, handle time, etc. As another example, the storage device 220 may store interaction data in an interaction database 224. Interaction data may include data relating to numerous past interactions between customers and contact centers. More generally, it should be understood that, unless otherwise specified, the storage device 220 may be configured to include databases and/or store data related to any of the types of information described herein, with those databases and/or data being accessible to the other modules or servers of the contact center system 200 in ways that facilitate the functionality described herein. For example, the servers or modules of the contact center system 200 may query such databases to retrieve data stored therewithin or transmit data thereto for storage. The storage device 220, for example, may take the form of any conventional storage medium and may be locally housed or operated from a remote location.

In regard to the stat server 226, it may be configured to record and aggregate data relating to the performance and operational aspects of the contact center system 200. Such information may be compiled by the stat server 226 and made available to other servers and modules, such as the reporting server 248, which then may use the data to produce reports that are used to manage operational aspects of the contact center and execute automated actions in accordance with functionality described herein. Such data may relate to the state of contact center resources, e.g., average wait time, abandonment rate, agent occupancy, and others, as functionality described herein would require.

The agent devices 230 of the contact center 200 may be communication devices configured to interact with the various components and modules of the contact center system 200 in ways that facilitate functionality described herein. An agent device 230 may further include a computing device configured to communicate with the servers of the contact center system 200, perform data processing associated with operations, and interface with customers via voice, chat, email, and other multimedia communication mechanisms according to functionality described herein. While FIG. 2 shows three such agent devices 230, any number may be present.

In regard to the multimedia/social media server 234, it may be configured to facilitate media interactions (other than voice) with the customer devices 205 and/or the web servers 242. Such media interactions may be related, for example, to email, voice mail, chat, video, text-messaging, web, social media, co-browsing, etc. The multi-media/social media server 234 may take the form of any IP router conventional in the art with specialized hardware and software for receiving, processing, and forwarding multi-media events and communications.

In regard to the knowledge management server 234, it may be configured to facilitate interactions between customers and the knowledge system 238. In general, the knowledge system 238 may be a computer system capable of receiving questions or queries and providing answers in response. The knowledge system 238 may be included as part of the contact center system 200 or operated remotely by a third party. The knowledge system 238 may include an artificially intelligent computer system capable of answering questions posed in natural language by retrieving information from information sources such as encyclopedias, dictionaries, newswire articles, literary works, or other documents submitted to the knowledge system 238 as reference materials, as is known in the art.

In regard to the chat server 240, it may be configured to conduct, orchestrate, and manage electronic chat communications with customers. In general, the chat server 240 is configured to implement and maintain chat conversations and generate chat transcripts. Such chat communications may be conducted by the chat server 240 in such a way that a customer communicates with automated chatbots, human agents, or both. In exemplary embodiments, the chat server 240 may perform as a chat orchestration server that dispatches chat conversations among the chatbots and available human agents. In such cases, the processing logic of the chat server 240 may be rules driven so to leverage an intelligent workload distribution among available chat resources. The chat server 240 further may implement, manage, and facilitate user interfaces (also "UIs") associated with the chat feature, including those UIs generated at either the customer device 205 or the agent device 230. The chat server 240 may be configured to transfer chats within a single chat session with a particular customer between automated and human sources such that, for example, a chat session transfers from a chatbot to a human agent or from a human agent to a chatbot. The chat server 240 may also be coupled to the knowledge management server 234 and the knowledge systems 238 for receiving suggestions and answers to queries posed by customers during a chat so that, for example, links to relevant articles can be provided.

In regard to the web servers 242, such servers may be included to provide site hosts for a variety of social interaction sites to which customers subscribe, such as Facebook, Twitter, Instagram, etc. Though depicted as part of the contact center system 200, it should be understood that the web servers 242 may be provided by third parties and/or maintained remotely. The web servers 242 may also provide webpages for the enterprise or organization being supported by the contact center system 200. For example, customers may browse the webpages and receive information about the products and services of a particular enterprise. Within such enterprise webpages, mechanisms may be provided for initiating an interaction with the contact center system 200, for example, via web chat, voice, or email. An example of such a mechanism is a widget, which can be deployed on the webpages or websites hosted on the web servers 242. As used herein, a widget refers to a user interface component that performs a particular function. In some implementations, a widget may include a graphical user interface control that can be overlaid on a webpage displayed to a customer via the Internet. The widget may show information, such as in a window or text box, or include buttons or other controls that allow the customer to access certain functionalities, such as sharing or opening a file or initiating a communication. In some implementations, a widget includes a user interface component having a portable portion of code that can be installed and executed within a separate webpage without compilation. Some widgets can include corresponding or additional user interfaces and be configured to access a variety of local resources (e.g., a calendar or contact information on the customer device) or remote resources via network (e.g., instant messaging, electronic mail, or social networking updates).

In regard to the WEM server 243, it may be configured to host and enable a suite of features focused on improving employee engagement in contact centers, which may be referred to broadly as "workforce engagement management" (or "WEM"). The WEM server 243 may provide solutions that simplify the agent experience and help drive results and employee satisfaction. The WEM server 243 may include capabilities such as call recording, screen recording, quality management, performance management, speech and text analytics, gamification, as well as capabilities related to workforce management (or "WFM") and workforce optimization ("WFO"). In general, WFM makes sure that the right resource is there at the right time for service, while WFO provides the ability to monitor and act upon the content of the interactions via quality management and interaction analytics. In addition to those functions, WEM further ensures that the prerequisites for enabling the contact center to provide effective customer service over the long-term by engaging the agents who provide the service. In doing this, the WEM server 243 may provide functionality aimed at allowing contact centers to improve metrics related to employee recognition, churn, and development.

Further, WEM recognizes a shift within the contact center industry from focusing on optimizing labor productivity and managing labor costs—i.e., workforce optimization—to a more employee-centric focus that engages agents throughout the employment life cycle. WEM applications are designed to increase agent engagement by automating tasks associated with scheduling, coaching, quality management, performance management and more. More specifically, the WEM server 243 may include core applications such as recording interactions across all channels, quality monitoring with automated scoring, workforce management with AI-infused scheduling and forecasting, performance management, speech and data analytics, and others. The WEM server 243 may further provide features such as gamification, robotic process automation, voice authentication, predictive analytics, chatbots, customer engagement hub, tools for building custom applications, and AI and analytics. For example, AI-infused algorithms can prepare more accurate agent schedules, customer insights, routing, etc., which consider more variables and have greater predictive power. Further, much of the tedious labor involved in quality monitoring can be automated, which saves time and money and improves agent morale. Other functionality may include any of the related features described herein as would be understood and enabled by one of ordinary skill in the art. Such enablement may include connections with any of the other servers, devices and data sources described herein.

In regard to the interaction server 244, it may be configured to manage deferrable activities of the contact center and the routing thereof to human agents for completion. As used herein, deferrable activities include back-office work that can be performed off-line, e.g., responding to emails, attending training, and other activities that do not entail real-time communication with a customer. As an example, the interaction server 244 may be configured to interact with the routing server 218 for selecting an appropriate agent to handle each of the deferable activities. Once assigned to a particular agent, the deferable activity is pushed to that agent so that it appears on the agent device 230 of the selected agent. The deferable activity may appear in a workbin 232 as a task for the selected agent to complete. The functionality of the workbin 232 may be implemented via any conventional data structure, such as, for example, a linked list, array, etc. Each of the agent devices 230 may include a workbin 232, with the workbins 232A, 232B, and 232C being maintained in the agent devices 230A, 230B, and 230C, respectively. As an example, a workbin 232 may be maintained in the buffer memory of the corresponding agent device 230.

In regard to the universal contact server ("UCS") 246, it may be configured to retrieve information stored in the customer database 222 and/or transmit information thereto for storage therein. For example, the UCS 246 may be utilized as part of the chat feature to facilitate maintaining a history on how chats with a particular customer were handled, which then may be used as a reference for how future chats should be handled. More generally, the UCS 246 may be configured to facilitate maintaining a history of customer preferences, such as preferred media channels and best times to contact. To do this, the UCS 246 may be configured to identify data pertinent to the interaction history for each customer such as, for example, data related to comments from agents, customer communication history, and the like. Each of these data types then may be stored in the customer database 222 or on other modules and retrieved as functionality described herein requires.

In regard to the reporting server 248, it may be configured to generate reports from data compiled and aggregated by the statistics server 226 or other sources. Such reports may include near real-time reports or historical reports and concern the state of contact center resources and performance characteristics, such as, for example, average wait time, abandonment rate, agent occupancy. The reports may be generated automatically or in response to specific requests from a requestor (e.g., agent, administrator, contact center application, etc.). The reports then may be used toward managing the contact center operations in accordance with functionality described herein.

In regard to the media services server 249, it may be configured to provide audio and/or video services to support contact center features. In accordance with functionality described herein, such features may include prompts for an IVR or IMR system (e.g., playback of audio files), hold music, voicemails/single party recordings, multi-party recordings (e.g., of audio and/or video calls), speech recognition, dual tone multi frequency recognition, faxes, audio and video transcoding, secure real-time transport protocol, audio conferencing, video conferencing, coaching (e.g., support for a coach to listen in on an interaction between a customer and an agent and for the coach to provide comments to the agent without the customer hearing the comments), call analysis, keyword spotting, and the like.

In regard to the analytics module 250, it may be configured to provide systems and methods for performing analytics on data received from a plurality of different data sources as functionality described herein may require. In accordance with example embodiments, the analytics module 250 also may generate, update, train, and modify predictors or models 252 based on collected data, such as, for example, customer data, agent data, and interaction data. The models 252 may include behavior models of customers or agents. The behavior models may be used to predict behaviors of, for example, customers or agents, in a variety of situations, thereby allowing embodiments of the present invention to tailor interactions based on such predictions or to allocate resources in preparation for predicted characteristics of future interactions, thereby improving overall contact center performance and the customer experience. It will be appreciated that, while the analytics module 250 is depicted as being part of a contact center, such behavior models also may be implemented on customer systems (or, as also used herein, on the "customer-side" of the interaction) and used for the benefit of customers.

According to exemplary embodiments, the analytics module 250 may have access to the data stored in the storage device 220, including the customer database 222 and agent database 223. The analytics module 250 also may have access to the interaction database 224, which stores data related to interactions and interaction content (e.g., transcripts of the interactions and events detected therein), interaction metadata (e.g., customer identifier, agent identifier, medium of interaction, length of interaction, interaction start and end time, department, tagged categories), and the application setting (e.g., the interaction path through the contact center). Further, as discussed more below, the analytic module 250 may be configured to retrieve data stored within the storage device 220 for use in developing and training algorithms and models 252, for example, by applying machine learning techniques.

One or more of the included models 252 may be configured to predict customer or agent behavior and/or aspects related to contact center operation and performance. Further, one or more of the models 252 may be used in natural language processing and, for example, include intent recognition and the like. The models 252 may be developed based upon 1) known first principle equations describing a system, 2) data, resulting in an empirical model, or 3) a combination of known first principle equations and data. In developing a model for use with present embodiments, because first principles equations are often not available or easily derived, it may be generally preferred to build an empirical model based upon collected and stored data. To properly capture the relationship between the manipulated/disturbance variables and the controlled variables of complex systems, it may be preferable that the models 252 are nonlinear. This is because nonlinear models can represent curved rather than straight-line relationships between manipulated/disturbance variables and controlled variables, which are common to complex systems such as those discussed herein. Given the foregoing requirements, a machine learning or neural network or deep learning approach is presently a preferred embodiment for implementing the models 252. Such models, for example, may be developed based upon empirical data using advanced regression algorithms.

The analytics module 250 may further include an optimizer 254. As will be appreciated, an optimizer may be used to minimize a "cost function" subject to a set of constraints, where the cost function is a mathematical representation of desired objectives or system operation. Because the models 252 may be non-linear, the optimizer 254 may be a nonlinear programming optimizer. It is contemplated, however, that the present invention may be implemented by using, individually or in combination, a variety of different types of optimization approaches, including, but not limited to, linear programming, quadratic programming, mixed integer non-linear programming, stochastic programming, global non-linear programming, genetic algorithms, particle/swarm techniques, and the like.

According to exemplary embodiments, the models 252 and the optimizer 254 may together be used within an optimization system 255. For example, the analytics module 250 may utilize the optimization system 255 as part of an optimization process by which aspects of contact center performance and operation are optimized or, at least, enhanced. This, for example, may include aspects related to the customer experience, agent experience, interaction routing, natural language processing, intent recognition, or other functionality related to automated processes.

In regard to the Experience Index module (or "XI module") 256, this component is configured to provide functionality related to assessing or measuring experience, for example, the experiences of employees, customers, and other stakeholders associated with the contact center system 200. As discussed in more detail below, the XI module 256 accomplishes this by orchestrating other components, servers, and modules of a contact center and the data related thereto, such as those components, servers, and modules described above in relation to the example contact center system 200, so to provide the functionality described herein, as would be understood by one of ordinary skill in the art.

The various components, modules, and/or servers of FIG. 2—as well as those of the other figures included herein—may each include one or more processors executing computer program instructions and interacting with other system components for performing the various functionalities described herein. Such computer program instructions may be stored in a memory implemented using a standard memory device. Although the functionality of each of the servers is described as being provided by the particular server, it should be recognized that the functionality of various servers may be combined or integrated into a single server, or the functionality of a particular server may be distributed across one or more other servers. Further, the terms "interaction" and "communication" are used interchangeably, and generally refer to any real-time and non-real-time interaction that uses any communication channel of the contact center. Access to and control of the components of the contact system 200 may be affected through user interfaces that may be generated on the customer devices 205 and/or the agent devices 230.

The Experience Economy

Turning now to FIGS. 3-18, the Experience Index Methodology will be further introduced and described in detail along with exemplary functionality and implementations. According to specific embodiments of the present invention, it will be appreciated that the XI Methodology may be implemented via the XI Module 256 and contact center systems 200 and/or similar or analogous systems. Before proceeding with this discussion, background will be provided in regard to a new approach to business and the rise of what has become known as the "experience economy". As part of this discussion, certain problems associated with this new approach will be examined. As will be seen, the present invention can be specifically geared to address each of these concerns.

Businesses are increasingly taking a more people-centric approach in how products are developed, sold, and supported, and this shift is significant to the rise of the experience economy. In the experience economy, as stated above, the experience of the people interacting with a business or other organization—for example, customers, employees, business partners, and other stakeholder—becomes the focus.

There are several reasons why this people-centric approach has become necessary. One of these is the acceleration of product lifecycles, which makes sustained product differentiation more difficult. Further, brands have become more difficult for companies to manage, as the permanent scrutiny of social media now outweighs the impact of company-driven brand management. Because of such developments, businesses are finding that the experiences of customers, employees, and business partners are key marketplace differentiators.

In experience economy, the traditional "inside out" perspective in optimizing how a business operates is no longer sufficient. One of the reasons for this is that the singular focus on the efficiency and effectiveness of a company's own operations often negatively impacts people's experiences. Instead, modern companies have come to adopt an "outside in", empathy-driven approach to drive operational decisions. This approach puts the experience of customers, employees, and business partners at the forefront of every business consideration. In a world where the competition is a mere click away, the trust and loyalty created by superior, empathetic experiences has become the best protection against competitive displacement as well as a pre-requisite for future growth.

This focus on experience has increased the importance of empathy in business. In this context, empathy represents a company's ability to listen and understand before acting. Empathy further implies that a business learns from its actions. As a result of this new empathetic approach, companies are asking themselves questions they have rarely asked before, like "What does this person expect now?", "How can we delight them?", and "What do we need to remember about them for our next encounter?" Further, as companies become more empathetic—shifting away from a business-centric mindset to one that is more people-centric—all aspects of the business are typically impacted. This is a result of the many different perspectives that need to be understood and accounted for once this people-centric approach is embraced.

Paramount to this new approach is a business's ability to leverage new technologies, as personal, automated, and self-service elements must be orchestrated into satisfying end-to-end experiences. For example, in relation to customer relations, cloud-based experience orchestration technologies have become essential. This is especially true when such services are provided at scale, for example, in customer call or contact centers, which handle customer relations for businesses and interact with multitudes of customers on a daily basis. Companies, thus, have begun to integrate an empathetic approach into their customer engagement solutions. As this transformation into the experience economy continues, companies will increasingly focus on trust and loyalty for long-term revenue growth. Further, companies will value employees as differentiators of its business, while using AI and other technologies to orchestrate better experiences.

A significant consequence of these developments is that businesses and other organizations need a better way to measure the quality of an experience (or "experience quality"). As will be appreciated, this is necessary if businesses are to improve or optimize the experiences they provide. As with any optimization problem, it is first necessary to accurately measure what exactly is being optimized. As will be seen, in the case of optimizing experiences, the experience measurement must embody the values of the experience economy if it is to be successful.

Research related to the present invention has indicated four attributes that are essential to produce a viable measurement of experience quality. Such measurements need to be: 1) people-centric, 2) versatile, 3) non-abstracting, and 4) actionable. Each of these characteristics will now be defined and described in turn. "People-centric" is a measurement attribute related to focusing on those aspects of the experience that are most important to people. As discussed more below, these key aspects may change as people's expectations evolve over time. "Versatile" is a measurement attribute assuring that the measurement can be applied to any affected group or stakeholder, for example, employees, customers, or business partners, even though each may have different needs with respect to the experience. "Non-abstracting" is the measurement attribute requiring that every increment in the way people rate the experience drives an increase of the experience measurement score. A non-abstracting measurement is advantageous as it avoids abstractions or classifications that make it more difficult to later correlate experience measurements to business KPIs. And, finally, "actionable" is the measurement attribute that helps identify how to improve the experience. In other words, a measurement score should be clearly attributable to a set of specific aspects of the experience itself (e.g., customer wait time) rather than the outcome of the experience (e.g., customer churn).

Before proceeding further, existing ways to measure experience will be discussed along with certain shortcomings that the present disclosure is intended to address. As will be appreciated, there are several conventional methods related to measuring the quality of an experience, which can be classified as follows: a) measurement of experience audience perceptions, b) measurement of process efficiency and effectiveness, and c) measurement of the business outcome produced by an experience. Each of these will now be discussed.

Conventional measurements of customer perception include survey-based experience measurements. Examples of these include Net Promoter Score, Customer Effort Score, and Customer Satisfaction. Net Promoter Score (or "NPS") asks one standardized question: "How likely are you to recommend Company X to your friends and family?" NPS then applies a standardized algorithm to calculate a score. NPS has been widely used for its simplicity. However, the biggest disadvantage of NPS is the inability to identify and act upon driving factors behind customers' responses to the question. Also, NPS is not non-abstracting, and therefore it is difficult to correlate with business results. For example, the NPS score of a group with everyone choosing "0" is the same as that of a group with everyone choosing "6". Thus, while NPS may be versatile, NPS is generally not actionable, non-abstracting, nor people-centric.

Customer Effort Score (or "CES") works similarly to NPS in that it presents a standardized statement ("X made it easy for me to handle my issue") and asks customers to indicate their agreement on a scale from 1 ("strongly disagree") to 7 ("strongly agree"). The average of all responses is then calculated as the final score. While the question is focused on the value to the customer, it is not established that this is the most important aspect of an experience to the customer. Thus, while CES may be versatile and non-abstracting, CES generally is neither people-centric nor actionable.

Customer Satisfaction (or "CSAT") provides businesses with more flexibility. With CSAT customers are asked to rate their satisfaction from 1 ("very satisfied") to 5 ("very dissatisfied") for different experience aspects that have been predetermined by the business. For each aspect, a Likert score is calculated, with the average of all Likert scores becoming the overall CSAT score. A key criticism around CSAT is that companies chose the questions and, as such, a CSAT measurement can intentionally or unintentionally fail to uncover major experience issues from the customer's perspective. As such, similar to CES, while CSAT may be versatile and non-abstracting, CSAT is generally not people-centric nor actionable.

There are similar deficiencies with the conventional measurements related to process efficiency or effectiveness. In contact centers, for example, the most prominent examples of such measurements include "Average Time to Respond", "Average Time to Resolution", and "First Contact Resolution". In contrast to survey-based measurements, these measurements represent contact center KPIs and can be measured internally. These measurements are often within the intersection of what both customers and the business desires. This is because the measurements are generally focused on aspects where the drive for efficiency and effectiveness is beneficial to both parties, i.e., quick connection to the right customer service representative, efficient communications, fast issue resolution, etc. However, these measurements ignore other aspects of the experience, specifically, those where the needs of customers and the business may be in conflict with each other. Thus, while process efficiency and effectiveness measurements may non-abstracting, they are generally not people-centric, versatile, nor actionable.

The other way of measuring experience quality is to focus on business outcomes. Such measurements, for example, may include the customer churn rate related to the experience, the revenue generated per customer, or the cost per interaction. While these are often easy to measure, they provide no indication as to how the experience would need to change to improve business outcomes. As such, while business outcome measurements may be non-abstracting, they are generally not actionable. Further, such measurements are generally not people-centric nor versatile.

Thus, the existing perception measurements and metrics related to business process and outcomes fail to satisfy the definition of a viable experience measurement, particularly, as such a measurement relates to the needs for the new experience economy. As disclosed herein, the disclosure of the present invention proposes an experience measurement or assessment process, which may be referred to herein as an "Experience Index Methodology". As will be seen, the Experience Index Methodology (or "XI Methodology") provides several advantages, while also addressing the shortcomings described above in relation to conventional approaches to assessing experiences. According to exemplary embodiments, the XI Methodology includes an experience optimization framework implemented via automation derived from data collection, analytical tools, and empirical models. According to exemplary embodiments, XI Methodology combines perception measurements and business metrics that together drive improved experience quality. In this way, XI Methodology is uniquely adept at improving business performance given the exigencies of the new experience economy.

The approach of the XI Methodology can be summarized with reference to the five steps. Each of these steps will now be briefly introduced with a more detailed discussion to follow.

A first step of the XI Methodology relates to what is referred to herein as an integrated measurement model. The integrated measurement model is a model that documents the experience being studied. The integrated measurement model may include phases within an experience, touchpoints within those phases, and relevant business KPIs of an experience. As will be seen, the integrated measurement model represents the view of the experience from the business's perspective, i.e., the provider of the experience (or "experience provider").

In a second step of the XI Methodology, the focus shifts to a people-centric view, as the key aspects of the experience (or "key experience aspects" or "KEAs") are identified. In this step, data is gathered via a pre-survey process from people who are exposed to the relevant experience, which may be referred to herein as an "experience audience" or "experience receivers". The experience receivers are asked about their preferences associated with the experience being studied. For example, experience receivers may be asked what the experience should ideally include and/or how the experience should occur. This may include asking the following questions. What are the key experience aspects? What is the relative importance of each of those key experience aspects? And, how do people perceive an experience that's delivering on those key experience aspects? As will be described in more detail below, the results of this research may then be used to create an importance weighting index, or simply "importance weights", and a perception weighting index, or simply "perception weights", in relation to the key experience aspects.

In a third step of the XI Methodology, the actual assessment or measurement of the experience is completed. Specifically, in this portion of the process, an experience quality is determined by collecting data at scale during a survey process, which may also be referred to as a "general survey process", from the experience receivers as to how well the KEAs are delivered in the experience. Using this collected data and then leveraging the importance weights and perception weights from above, the experience quality is calculated as a value that is referred to herein as an Experience Index (or "XI"). The XI value provides a measure of the experience quality in terms of delivering the KEAs. As will be seen, this value can be calculated in several ways to highlight measures of certain aspects of the experience. For example, the Experience Index may be calculated in relation to a specific perception, in which case the value may be referred to as a Perception Experience Index (or, "PXI"). As will be discussed more below, the XI and/or PXI may be calculated by combining the collected assessment data from the surveys and the weighted indexes that were calculated during the second step.

The fourth step of the XI Methodology focuses on determining actions for improving the experience, which may be referred to herein as "actionable insights". As part of this step, the results of the calculated Experience Index value are correlated with business KPIs. One of the objectives of this step is to determine how well the Experience Index Assessment explains business performance.

In the fifth step of the XI Methodology, improvements to the experience (or "experience improvements") are made. That is, action is taken toward improving the experience. As will be seen, according to preferred embodiments, the present invention is configured so results focus such improvement toward areas where correlation between the XI and business KPIs is strong and the measure of the experience is low. In this way, improvement efforts are generally targeted at areas where return on investment is most impactful.

It should be understood that the approach of the Experience Index Methodology may be implemented as a continuous improvement cycle. More specifically, the above steps may be performed so that the experience is modeled, measured, correlated with KPIs, and improved. Then, at defined intervals, one or more of the steps may be performed again using more recently gathered data. In this way, the experience can be further improved so that it remains current with the ever-evolving expectations of the experience audience. More details will now be provided in relation to the particular steps of the XI Methodology.

Integrated Measurement Model

Figure 3:
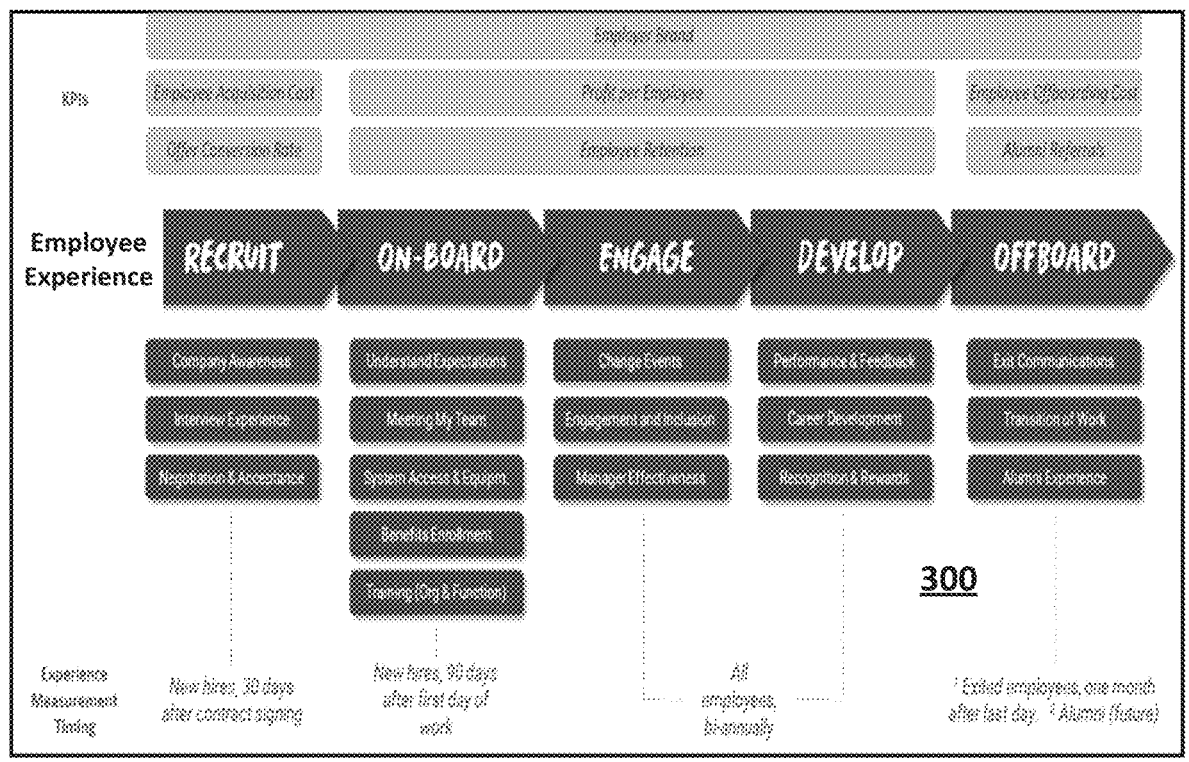
FIG. 3 is schematic block diagram an exemplary integrated measurement model according to embodiments of the present invention.

With reference now to FIG. 3, a schematic representation of an exemplary integrated measurement model 300 is provided. As stated, an integrated measurement model is a model that documents an end-to-end experience. The integrated measurement model is specific to a particular audience or stakeholder. For example, the experience and expectations of a customer are different from that of an employee, even if both participate in the same business scenario or experience. Furthermore, integrated measurement models differ by industry, for example, the experience of a banking customer differs significantly from that of a patient in a healthcare scenario. As shown, the example of FIG. 3 is a model of an employee experience. The integrated measurement model 300 shows an end-to-end employee experience that includes five phases: Recruit, Onboard, Engage, Develop, and Offboard. Each phase has associated touchpoints. For example, the Recruit phase has touchpoints that include: Company Awareness; Interviewing; and Negotiation & Acceptance. Further, the integrated measurement model 300 of FIG. 3 has KPIs associated with the phases. The integrated measurement model 300 of FIG. 3 will be discussed further below in relation to an exemplary implementation.

In general, an integrated measurement model may be configured to cover a set of phases within an experience, with each phase tied to a specific milestone in the experience. For customer experiences, milestones usually frame phases like consideration, evaluation/decision, post-purchase experience/launch, utilization, and loyalty/expansion. For employee experiences, phases covered may include attraction/recruitment, onboarding, engagement/retention, development, and separation/off-boarding. At the end of each phase, experience quality may be measured for each of the touchpoints within the phase. For example, once the onboarding phase is complete, the onboarding experience for an employee may be measured, covering touchpoints like "meeting the team for the first time" or "getting access to equipment". The integrated measurement model therefore also captures the timing of such measurements as part of the model.

A key element of the integrated measurement model are key performance indicators (or "KPIs"). KPIs capture how the provider of the experience measures their own business success. For example, an employer may be focused on improving their employee experience to drive employee retention or profitability per employee. The same KPI may cover more than one phase. For example, employee retention may be driven by onboarding, engagement, and development experiences. In summary, the integrated measurement model describes the end-to-end experience in detail and highlights which KPIs are being optimized by improving the quality of specific touchpoints within the experience.

Key Experience Aspects

As stated, the Experience Index Methodology seeks to understand the experience and people's expectations of it before asking them about the quality of the experience. This understanding of the experience is primarily developed in relation to the key experience aspects (or "KEAs") introduced above. In accordance with preferred embodiments, KEA have several facets or attributes. A first significant attribute of a KEA is "importance", which, as used herein, is a measure as to how important a KEA is to the overall experience in relation to the other KEAs. Another significant attribute of a KEA is "perception", which, as used herein, is a measure as to how well a particular KEA aligns with a given perception. The given perceptions may be provided as a particular word or phrase that conveys a mental impression for associating with an experience. As will be seen, examples of perceptions used herein include "empathy", "efficiency", and "effectiveness". Though, of course, other words or phrases may be used as perceptions and the selection of those will depend upon the experience being evaluated. As will be discussed more in the subsequent section, another significant facet of a KEA is evaluation, which, as used herein, is a measure as to how well an organization (i.e., an experience provider) does in delivering the KEAs of an experience.

In accordance with exemplary embodiments, during a pre-survey process, a set of pre-surveys are completed to develop the necessary understanding of the experience. Such pre-surveys may be aimed at a representative subset population. The representative subset population, for example, may be a subset of a larger population that is representative of the audience of the experience being studied. As part of this process, one or more pre-surveys may first be used to identify the KEAs of a given experience. Then, one or more additional pre-surveys may be used to determine the relative importance of those KEAs and the perceptions evoked by each. Thus, this part of the Experience Index Methodology may be divided into three steps, which include: 1) determining the key aspects of an experience, i.e., the KEAs; 2) determining a relative importance or weights for the KEAs; and 3) determining perceptions created by the KEAs and weights of those perceptions.

Accordingly, in exemplary embodiments, the pre-survey process generally includes surveying one or more representative subset populations within the general population of experience receivers (which may also include prospective experience receivers). The KEAs of an experience may be identified from feedback received from one of these representative subset populations. To begin this process, a set of candidate key experience aspects (or "candidate KEAs") is determined. Sources for such candidates often include verbatims from a pre-survey, which may include targeted interviews, as well as best business practices. Once these are gathered, the candidate KEA can then be ranked via another pre-survey. From the ranking, the top (n) candidate KEAs may be selected as the KEAs for the experience. Note that the "top (n)" is the number of KEAs that will later be used to survey the entire population during the assessment of the experience being studied. In preferred embodiments, it is recommended that the number of candidate KEAs is between 5 and 15. Further, the number of KEAs (n) selected from that list of candidate KEAs is recommended to be between 3 and 7.

With the key experience aspects determined, the next step is to weight the KEAs according to importance. This may be calculated via additional pre-survey in which participants are asked to rank the top (n) key experience aspects by order of importance. For example, respondents may be asked to rate the five KEAs in terms of importance, i.e., one through five, with relative scoring for each depending on where the KEA is ranked. The importance weights for the KEAs may then be calculated. As will be appreciated, such weights may be calculated using various mathematical techniques. In accordance with an exemplary embodiment, the following equation may be used to calculate the importance weights between the KEAs:

$$\omega_n = \frac{\sum_{m=1}^{M} \rho_{k,m}}{M \sum_{k=1}^{K} \rho_k}$$

$$\omega_n = \frac{1}{M} \sum_{m=1}^{M} r_m$$

Within this equation, it will be understood that:
$\omega_n$ is the importance weight for KEA n;
k indexes the possible responses to the question;
m is the index over respondents;
M is the total number of respondents;
$\rho_k$ are the response values;
$\rho_{k,m}$ is the response value for respondent m; and
the term $\Sigma_{k=1}^{K} \rho_k$ is the sum of all possible response values.

As an example, respondents may be asked to rate five KEAs in terms of importance, one through five. These ranks may then be assigned values from 1 to 5, with a ranking of most important receiving a value of 5, second most important receiving a value of 4, and so forth. Thus, in this example the term $\Sigma_{k=1}^{K} \rho_k=10$. This the relationship between $r_m$ and $\rho_{km}$ to be defined as follows:

$$r_m = \frac{\rho_{k,m}}{\sum_{k=1}^{K} \rho_k} = \frac{\rho_{k,m}}{10}$$

This leads to an alternative mapping between importance ranking responses and values as being:
1→0.33
2→0.27
3→0.20
4→0.13
5→0.07

With reference now to FIG. 4, an exemplary Key Experience Aspect Importance Weighting Index (or "KEA Importance Weighting Index") 400 is shown. The KEA Importance Weighting Index 400 provides a relative importance weighting between the KEAs based on the ranking responses obtained during the pre-survey process. In the example of FIG. 4, the responses from five different respondents are shown ("Response 1" through "Response 5"). It will be appreciated that many other responses would be obtained in the pre-survey process. Each responder was asked to rate the importance of five different KEAs (which are number as "KEA$_1$" through "KEA$_5$"). As will be appreciated, each of the numbered KEAs represents a different key experience aspect. As indicated, given the rankings provided by the five responders and the averages thereof, it is calculated that KEA$_1$ is rated as most important with a weight of 0.28, KEA$_4$ is rated next in importance with a weight of 0.24, KEA$_2$ is rated next in importance with a weight of 0.20, KEA$_3$ is rated next in importance with a weight of 0.16, and KEA$_5$ is rated last in importance with a weight of 0.12.

With reference now to FIG. 5, an exemplary KEA Perception Weighting Index 500 is shown. As will be appreciated, the KEA Perception Weighting Index 500 relates to determining the perceptions evoked by each of the KEAs. As stated, the Experience Index is capable of not only measuring the experience quality, but also determining the degree to which an experience evokes a specific perception (or "E"). To determine the perceptions evoked and a weighting thereof, the perception weighting index is used. For example, a representative subset population of the experience receivers may be asked to choose which perception $E_1$ to $E_q$ is most evoked if the experience fully delivers on a given one of the KEAs. Specifically, the respondents may be asked to pick between perceptions provided for the key experience aspects. The type of perceptions used in this part of the process may include any relevant to the experience being studied. In accordance with preferred embodiments, the number of perceptions measured (q) should remain relatively small, for example, between 2 and 5. The example shown in FIG. 5 includes three perceptions, $E_1$, $E_2$, $E_3$, which, for example, correspond to: "efficiency" (i.e., the efficiency of the experience), "empathy" (i.e., the empathy delivered through the experience), and "effectiveness" (i.e., the effectiveness of the experience).

Given the responses obtained from the pre-survey, perception weights for the KEAs may then be calculated. As will be appreciated, such weights may be calculated using various mathematical techniques. In accordance with an exemplary embodiment, the following equation may be used to calculate the perception weights for the KEAs:

$$\epsilon_{n,q} = \frac{1}{M} \sum_{m=1}^{M} \delta_{m,q}$$

Within this equation, it will be understood that:
$\epsilon_{n,q}$ is the perception weight for perception q and KEA n;
m is the index over respondents;
M is the total number of respondents; and
$\delta_{m,q}$ is mutually exclusive response value for respondent m and perception q.

In the exemplary KEA Perceptions Weighting Index 500 of FIG. 5, five different exemplary responses are shown in which separate responders were asked to select which of the perceptions ($E_1$, $E_2$, $E_3$) would be most evoked if the experience fully delivers on a given one of the KEAs (i.e., one of KEA$_1$ through KEA$_5$). As shown, in regard to KEA$_1$, four of the five responders selected the perception $E_1$ as being most evoked, while a single responder selected the perception $E_2$ as being most evoked. These responses resulted in a normalized relative perception weight for KEA$_1$ of 0.8 for $E_1$, 0.2 for $E_2$, and 0.0 for $E_3$. Perception weights for each of the other key experience aspects are similarly calculated. As will be appreciated, this is an example calculation of the perception weight that includes five respondents (m), five KEAs (n), and three perceptions (E). As will be appreciated, this results in a total of fifteen different weights, which are displayed across the bottom row of the KEA Perceptions Weighting Index 500.

In this way, the pre-survey process may be used to identify the KEAs of an experience as well as the importance weights and perception weights for the KEAs. It should be understood that a minimum number of pre-survey responses need to be collected, with the size of the minimum depending on the size of the overall population and can be adjusted depending on desired confidence level. Further, as expectations regarding an experience change over time, it is recommended that the pre-survey research process be repeated at specific time intervals. Significant to the determination of those time intervals is finding an acceptable balance between keeping the results of the Experience Index Process comparable over time while also ensuring that evolving experience expectations are being reflected. In accordance with preferred embodiments, when pre-surveys are repeated, it is recommended that previously identified KEAs remain in the set of candidate KEAs.

The Experience Index

Having completed the pre-surveys and calculated the importance and perception weights, the actual measurement or assessment of a given experience can be completed as part of a general survey process. With general reference now to FIGS. 6 and 7, the results of this assessment may be referred to as an Experience Index (or "XI") or Experience Index score (or "XI score"). In completing this assessment, a general survey may be administered in which a broader set of responses is gathered from the full or larger population of experience receivers, i.e., the experience audience. These responses, for example, may be obtained through point-in-time surveys associated with the experience being studied. The survey may be administered electronically via one or more user interfaces generated on the user devices of the respondents.

Alternatively, as discussed more below, once a sufficient base of data has been collected and, for example, a machine learning algorithm has been trained on it, predictive algorithms may be used so to reduce the number of surveys needed. The responses may then be transformed using the weights (i.e., the importance weights and perception weights) developed during the pre-survey process. In this way, the understanding of the experience expressed in the developed weights refines the results so to enhance insight into experience quality.

As an example, the general survey process may include a survey that ask participants (i.e., experience receivers) the extent to which they agree that an experience delivers on each of the key experience aspects. This data may be collected across n KEAs with varying levels of agreement provided as possible responses. For example, five agreement levels may be provided with the levels including "strongly disagree", "disagree", "neutral", "agree", and "strongly agree". The Experience Index may be calculated over all the given perceptions. Due to the definition of the perception weights, the term $\Sigma_{q=1}^{Q} \epsilon_{n,q}=1$. Thus, the Experience Index may be calculated as a weighted sum using just the importance weights, as shown in the following equations:

$$XI_z = \frac{\sum_{n=1}^{N} \sum_{q=1}^{Q} \omega_n \epsilon_{n,q} s_n}{\sum_{n=1}^{N} \sum_{q=1}^{Q} \omega_n \epsilon_{n,q} s_{max}}$$

$$= \frac{\sum_{n=1}^{N} \omega_n s_n \left(\sum_{q=1}^{Q} \epsilon_{n,q}\right)}{\sum_{n=1}^{N} \omega_n s_{max} \left(\sum_{q=1}^{Q} \epsilon_{n,q}\right)}$$

$$= \frac{\sum_{n=1}^{N} \omega_n s_n}{\sum_{n=1}^{N} \omega_n s_{max}}$$

With reference now to FIG. 6, an exemplary Experience Index 600 is provided in which an XI score of 0.65 is calculated for a given respondent ($s_n$). For the purpose of the example, the Experience Index 600 is provided in a format having several columns that show the different types of data relevant to the calculation of the XI score and the manner in which the XI score is calculated. Specifically, a first column of the Experience Index 600 includes the several KEAs (i.e., $KEA_1$ through $KEA_5$). A second column of the Experience Index 600 includes the importance weights, $\omega_n$, for the KEAs, the calculation of which was provided above in relation to FIG. 4. A third column the Experience Index 600 includes the numerical values, $s_n$, associated with the responses provided by the particular respondent. For example, the respondent may have provided responses as part of a survey in which the respondent is asked their agreement level with an affirmative statement that the experience fulfilled expectations with regard to each of the KEAs. The survey may have provided the respondent a choice of five agreement levels with that affirmative statement, ranging from "strongly disagree" to "strongly agree", which are then translated into numerical scores, 0.0 to 4.0, respectively. As shown in FIG. 6, in relation to the KEAs, the respondent ($s_n$) responded: 4 (or "strongly agree") in relation to $KEA_1$; 3 (or "agree") in relation to $KEA_2$; 1 (or "disagree") in relation to $KEA_3$; 2 (or "neutral") in relation to $KEA_4$; and 2 (or "neutral") in relation to $KEA_5$.

A fourth column the Experience Index 600 includes the maximum numerical score (or maximum Likert value), $s_{max}$, for the agreement levels. The maximum Likert value is 4.0 (which is associated with "strongly agree" level of agreement). A fifth column of the Experience Index 600, which is $\omega_n s_n$, shows the numerical response of the particular respondent as modified by the associated importance weight. And, finally, a sixth column of the Experience Index 600, which is $\omega_n s_{max}$, shows the maximum Likert value as modified by the associated importance weight. As shown, each of the fifth and the sixth column are then summed. The sum of the fifth column is 2.6. It will be appreciated that the sum of the sixth column is necessarily 4.0 because the normalized importance weights ($\omega_n$) add to 1.0. With these values determined, the XI score can then be calculated by dividing 2.6 by 4.0, which produces the XI score of 0.65, or 65%. As will be appreciated, the XI score is an assessment or measure of experience quality. The XI score is a measure of how well KEAs are delivered that also considers the importance weights of the KEAs that were determined during the pre-survey process.

In accordance with alternative embodiments, the assessment of experience quality can also be calculated in relation to a specific one of the perceptions. When this is done, the Experience Index may also be referred to as a Perception Experience Index (or "PXI") and the calculated result may be referred to as a PXI score. With reference now to FIG. 7, an exemplary Perception Experience Index 700 is provided that calculates an PXI score of 0.725, or 72.5%, for a particular respondent ($s_n$) for a given one of the perceptions. That is, the PXI score is an aggregated transformation of the survey results from an experience from a particular respondent along all the KEAs for a given perception. As will be appreciated, similar to the XI score, the PXI score may be normalized in such a way that the value of the PXI is between 0 and 1, inclusive. In general, the PXI score can be calculated for a single respondent using the following equation:

$$PXI_{q,z} = \frac{\sum_{n=1}^{N} \omega_n \epsilon_{n,q} s_{z,n}}{\sum_{n=1}^{N} \omega_n \epsilon_{n,q} s_{max}}$$

Within this equation, it will be understood that:

$PXI_{q,z}$ is the PXI for respondent z and perception q;

n is the index over KEA;

Z is the total number of KEAs;

$\omega_n$ is the importance weight for KEA n;

$\in_{n,q}$ is the perception weight for KEA n and perception q;

$s_{z,n}$ is the Likert value for respondent z and KEA n;

$s_{max}$ is the maximum Likert value.

With specific again reference to FIG. 7, an exemplary Perception Experience Index 700 is provided in which an XI score of 0.65 is calculated for a given respondent ($s_n$). For the purpose of the example, the Perception Experience Index 700 is also provided in a format having several columns that show the different types of data relevant to the calculation of the PXI score and the manner in which the PXI score is calculated. Specifically, a first column of the Perception Experience Index 700 includes the several KEAs (i.e., $KEA_1$ through $KEA_5$). A second column of the Perception Experience Index 700 includes the importance weights, $\omega_n$, for the KEAs, the calculation of which was provided above in relation to FIG. 4. A third column includes the perception weights for each particular perception, $\in_{n,1}$, the calculation of which was provided above in relation to FIG. 5. A fourth column the Perception Experience Index 700 includes the numerical values, $s_n$, associated with the responses provided by the particular respondent, which are the same as they were in FIG. 6. A fifth column the Perception Experience Index 700 includes the maximum numerical score (or maximum Likert value), $s_{max}$, for the agreement levels. The maximum Likert value is 4.0 (which is associated with "strongly agree" level of agreement). A sixth column of the PXI 700, which is $\omega_n \in_{n,1} s_n$, shows the numerical response of the particular respondent as modified by the applicable importance weight and the perception weight. And, finally, a sixth column of the PXI 700, which is $\omega_n \in_{n,1} s_{max}$, shows the maximum numerical score as modified by the applicable importance weight and the perception weight. As shown, the sum of the sixth column is 1.392, and the sum of the seventh column is 1.92. Given these values, the PXI score can then be calculated by dividing 1.392 by 1.92, which produces a PXI score of 0.725. As will be appreciated, the PXI score is an assessment or measure of experience quality. More specifically, the PXI score is a measure of how well KEAs are delivered that also takes reflects both the importance weights and perception weights of the KEAs that were determined during the pre-survey process.

As will be appreciated, the procedure outlined above for both the Experience Index (XI) and Perception Experience Index (PXI) calculates the provided index scores for a single respondent. In accordance with an exemplary embodiment, calculating the Experience Index or Perception Experience Index over a population of respondents may include simply averaging the values calculated for the individuals within that population. Examples of these calculations are shown in the equations below:

$$PXI = \frac{1}{Z}\sum_{z=1}^{Z} PXI_{q,z}$$

$$XIA = \frac{1}{Z}\sum_{z=1}^{Z} XI_z$$

The Experience Index score (i.e., for the larger population) may be represented as a decimal between 0 and 1, inclusive, or percentage between 0 and 100. The Perception Experience Index score also may be represented in this manner. As will be appreciated, the value of Experience Index captures the degree to which the surveyed population agrees that an experience fully meets expectations across all of the key experience aspects. In accordance with exemplary embodiments, the same Likert function can be used for both the second step of the pre-surveys and the actual survey across the entire population. As will be appreciated, an advantage of calculating detailed scores around specific perceptions, i.e., the Perception Experience Index, is that results can be compared over time at a more detailed level even if KEAs change. Further, experiences can also be benchmarked at a more detailed level, which may provide more specific guidance as to how an experience is perceived by an audience.

Actionable Insights

The XI Methodology provides a deeper understanding of experiences compared to traditional metrics. For example, the XI Methodology is able to narrow on specific KEAs and applicable demographic slices. It is possible that within one sub-experience, one of the KEAs is performing well whereas another is performing poorly. As data is tracked over time, patterns surface that help guide the focus areas for improvement. Applying demographic filters (i.e., region, segment, department) provides targeted insights for subsets of a population. Multiple filters can be applied to generate different data slices, allowing for dynamic and flexible analysis. In this way, the results of the Experience Index may be used for benchmarking and correlation analysis to determine actionable insights for improving an experience. For example, benchmarking Experience Index results may be done to identify trends at scale and cohorts that represent outliers with respect to survey responses and experience scores. Analysis of such outliers may then provide a way to understand what drives a positive or a negative experience and, therefore, represents the first step towards experience improvement.

One way benchmarking may be enabled is by collecting additional information about each respondent and associating that information to the respondent's survey response. This additional information can be demographic data, time stamps, or any other data that allows the grouping responses into cohorts $G_1$ to $G_n$ whose Experience Index results are going to benchmark against each other.

Cohorts $G_1$ to $G_n$ can be benchmarked based on a variety of dimensions. For example, in certain exemplary embodiments, the Experience Index scores may be compared across the various cohorts to determine which cohort has the best overall experience, cohort outliers, etc. In other embodiments, the XI scores of the different phases within an end-to-end experience may be analyzed and compared to determine weak points within the experience as well as how adjoining phases affect each other. Further, the XI scores of the different audiences within an experience may be analyzed to determine how each affects the other. For example, in a contact center setting, the XI scores of agents vs. the XI scores of customers within a common experience. In other embodiments, the specific Experience Index scores $XI_e$ for each cohort $G_i$ may be analyzed to compare how much each cohort believes the experience drives a given perception.

Figure 8:
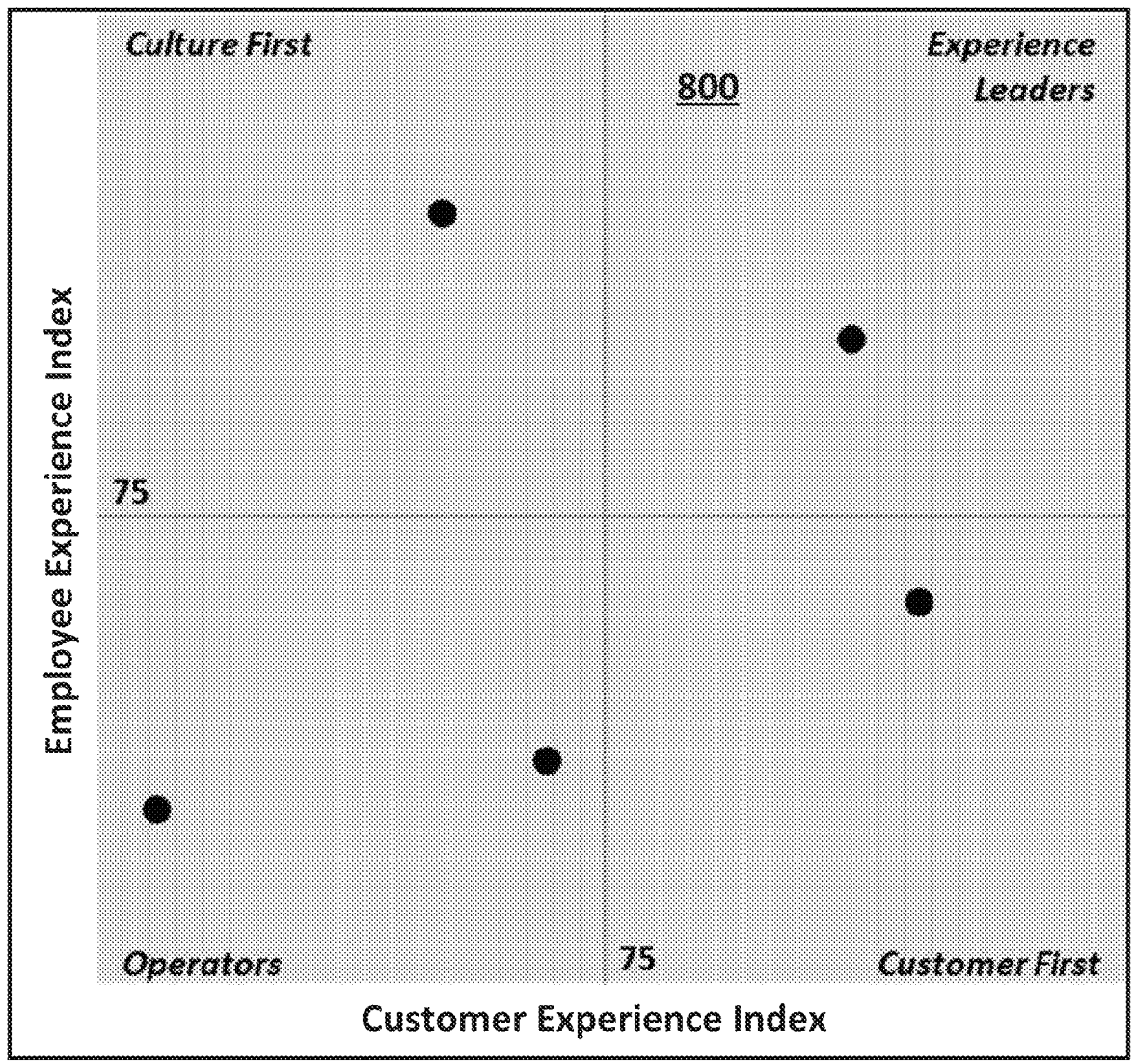
FIG. 8 is an exemplary Experience Quadrants according to embodiments of the present invention.

With reference to FIG. 8, in accordance with another exemplary embodiment, the results may be plotted in what will be referred to herein as an "Experience Quadrants™", which is shown in FIG. 8 as exemplary Experience Quadrants 800. For example, the mean (i.e., arithmetic, geometric) and the standard deviation of a benchmark cohort may be calculated. Then other cohorts may be compared to the benchmark cohort by calculating the absolute value of the difference in the means of the two cohorts and comparing it to the standard deviation of the benchmark cohort. Results can then be provided in the Experience Quadrants by plotting the harmonic means of the "Employee Experience" and "Customer Experience", as shown in FIG. 8. For example, each plotted dot may be representative of data collected from a different company.

Acting on negative outliers found through benchmarking and related analysis may improve business performance. This is particularly true if XI scores can be effectively correlated with business KPIs. The correlation of business KPIs with both individual responses and with aggregated cohort Experience Index scores becomes possible one the specific business KPI achievements for each cohort $G_1$ to $G_n$ are known. For example, the XI scores of employee experience may be correlated with employee retention data. This correlation may be performed by division or department if individual data is unavailable or needs to remain anonymized. In such a case, experience survey results per department may be collected and correlated against retention data per department. As will be appreciated, running this type of correlation (i.e., XI scores against employee retention data over time) may require time stamping survey responses in addition to having access to time stamped retention data. The results of the correlation may provide an effective tool for businesses to identify specific areas within an experience for improvement. Further, the improvement of those identified areas will target enhanced performance with regard to the correlated KPIs.

Experience Improvement

The final step in the Experience Index Methodology is the improvement of the experience itself. Given the approach outlined herein, improvement efforts can be focused on areas where the correlation between the Experience Index results and a business KPI is high, and the Index result itself is below average. For example, according to exemplary embodiments, a given cohort, cohort G, may be identified as a negative outlier in a benchmark analysis against other cohorts. The responses across all experience aspects for cohort G may then by analyzed. Considering the weights for each experience aspects, it can then be determined the best course of action to improve experience results for cohort G. This, in turn, will lift the Experience Index score for the overall population. Specific aspects of the Experience Index Methodology will be further explained in relation to results obtained in exemplary real-world implementations related to employee and customer experiences.

Exemplary Use Case-Employee Experience

In this first exemplary use case, the XI Methodology is implemented in relation to an employee experience at a particular company, which will be referred to simply as "Company". With references again to the example provided in FIG. 3, the XI Methodology begins with the creations of an integrated measurement model. As shown in FIG. 3, the integrated measurement model may break down an end-to-end employee experience into 5 phases and associated touchpoints. For the sake of the example implementation, focus will be on the "Engage" phase to illustrate how the data collection and calculations introduced above could be performed.

First, qualitative research is conducted to understand what mattered most to employees in the Engage phase of the experience. From this research, a list of candidate KEAs is developed. Then, a pre-survey is performed to narrow down the list of candidate KEAs. As described above, this may in several ways, for example, by performing a pre-survey in which employees are asked to rank the candidate KEAs by importance or select a predetermined number of the most important ones from the list. From this, the list may be narrowed to the top (n) candidate KEAs, which are deemed the KEAs for the experience or, in this case, phase of the experience. Thus, the narrowed list of candidate KEAs becomes the KEAs of the Engage phase of the experience. In the example, the KEAs are found to be the following: 1) "My immediate manager cares about me as a person"; 2) "My Company provides an atmosphere where I can be my authentic self at work"; 3) "I am accepted by my immediate coworkers"; 4) "I am confident that leadership (VP+) will lead the Company to future success"; and 5) "I see professional growth and career development opportunities for myself at my Company".

As another part of the pre-survey process, the importance weights for the KEAs are calculated. To do this, a representative subset of employees is asked to rank the five KEAs by importance. An example of how this may be accomplished is provided in FIG. 9, which shows an exemplary user interface 900 for ranking KEAs. As shown, the user interface 900 asks each responding employee to sort the list KEAs in order of importance so that the most important KEA is positioned at the top of the list and the least important KEA is positioned at the bottom of the list. With reference now to FIG. 10, the importance weights are calculated using the responses received. For example, the importance weights may be calculated in the manner described above. As shown in FIG. 10, with an importance weight of 27.4%, the KEA stating "My immediate manager cares about me as a person" was calculated as the most important.

A subsequent part of the pre-survey process includes calculating the perception weights for the KEAs. In this example implementation, the perceptions of empathy, effectiveness, and efficiency were chosen for evaluation with the KEAs. It should be understood that empathy, effectiveness, and efficiency are being measured from the perspective of the person who is going through the experience, not from the perspective of the business. To calculate the perception weights, a representative subset of employees is asked which perception each of the KEAs drives. Specifically, respondents are asked to choose either empathy, efficiency, or effectiveness for each KEA. An example of how this may be accomplished is provided in FIG. 11, which shows an exemplary user interface 1100 for asking respondents to make this type of choice. As shown, the user interface 1100 asks each responding employee what they think of an employee experience that delivers on the following KEAs and then provides a way for the employee to select only one of the available perception choices. (Note that only two of the five KEAs are shown.) With reference now to FIG. 12, the perception weights are calculated using the responses received. For example, the perception weights may be calculated in the manner described above. As shown in FIG. 12, for example, the KEA stating "My immediate manager cares about me as a person" was found to drive the Empathy perception more than either Efficiency or Effectiveness.

Figures 13, 14:
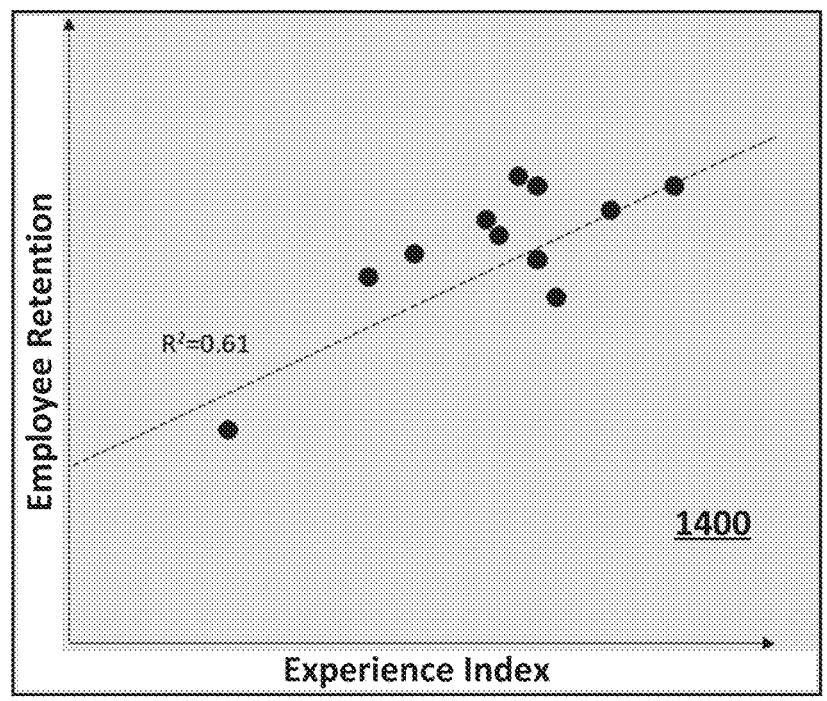
FIG. 13 shows an exemplary survey for asking employees a level of agreement as to how well a KEA is delivered.
FIG. 14 shows a correlation analysis according to an exemplary implementation of the Experience Index Methodology.
Figure 15:
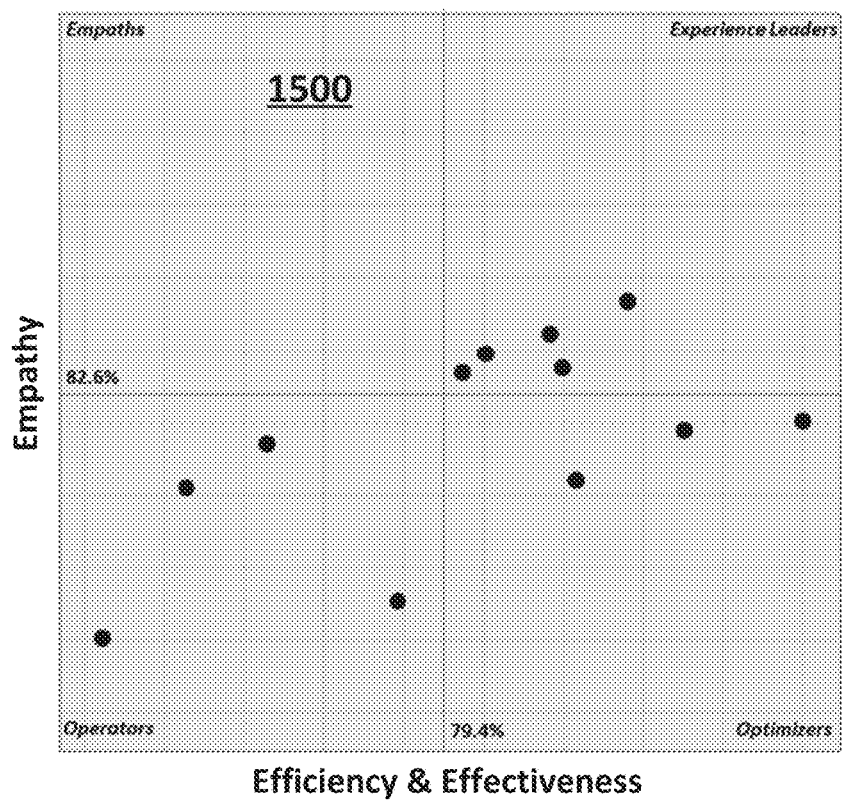
FIG. 15 is an exemplary plot showing benchmarked Experience Index results.
Figure 16:
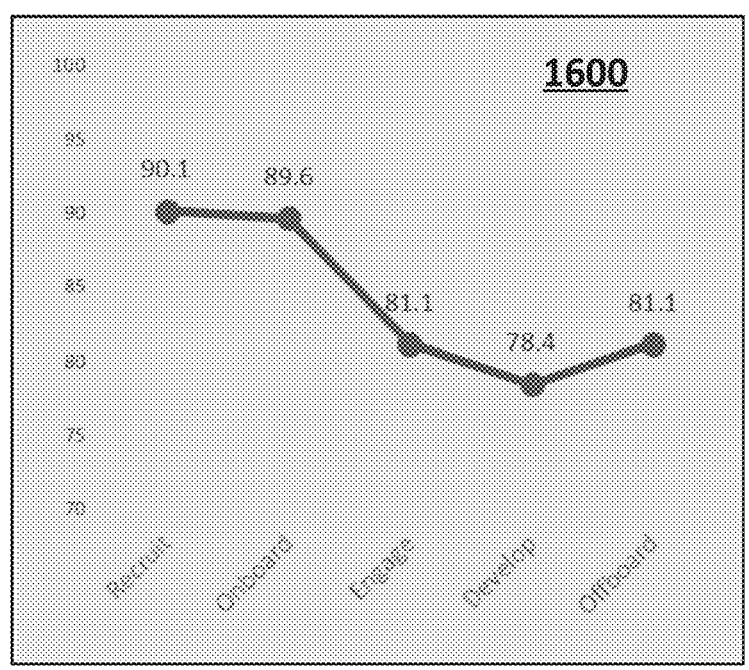
FIG. 16 is an exemplary plot comparing Experience Index results for the different phases of an end-to-end experience.

With the pre-survey process complete, the larger population of employees was surveyed to measure the quality of the experience in the engage phase. With reference to FIG. 13, for example, this survey may include asking each employee a level of agreement (for example, "Strongly Disagree", "Disagree", "Neutral", "Agree", and "Strongly Agree") as to how well the Company delivered the KEAs in their own employee experience. More generally, the survey is determining the degree to which survey participants agree that their Company offers a specific one of the KEAs in its employee experience. (Note only two of the five KEAs are shown.) Using the Likert function f(j)=j−1, the Experience Index score for the Engage phase of the employee experience is calculated to be 0.81 or 81.1%. Further, Experience Index scores for particular perceptions are also calculated. As stated, such scores may be referred to as Perception Experience Index scores. These scores are calculated as follows: $PXI_{efficiency}$=79.3%; $PXI_{effectiveness}$=79.6%; and $PXI_{empathy}$=82.6%.

Before benchmarking the various organizations at the Company with respect to their employee experience, the positive business impact of achieving higher Experience Index results by correlating Employee Retention, a key performance indicator, with Experience Index results across the different organization within the Company. The results of this correlation are provided in FIG. 14. As shown, the correlation proved relatively strong with an $R^2$ value of 0.61. In the example implementation, the Experience Index results were found to correlate more strongly with Employee Retention than any of the aspects alone. In the plot of FIG. 14, it should be understood that every plotted point represents a dedicated organization within the Company, for example, finance, sales, marketing, or IT.

Other analytical outputs were obtained from the survey results. For example, with reference now to FIG. 15, a plot 1500 shows results in which different departments within the Company were benchmarked with regards to their Perception Experience Index scores in a 2×2 chart. On the X-axis, the geometric mean of the efficiency and effectiveness perception scores was applied, i.e., $$\sqrt[2]{PXI_{efficiency} \cdot PXI_{effectiveness}}.$$

On the Y-axis, the empathy perception score, $PXI_{empathy}$, was applied. From this plot, the results were analyzed for the negative outliers in the experience benchmark. The 4 plotted points in the "operators" quadrant were found to constitute such outliers. From there, actions were taken around employee development and career management across the Company to improve Experience Index results and business performance. Further, with reference now to FIG. 16, a plot 1600 shows results in which Experience Index scores for each phase of the employee experience are plotted. This type of result highlights the phases within the employee experience that are most in need of improvement.

Going forward from the implementation, for example, the Company may continue to measure, analyze, and improve its end-to-end employee experience with the Experience Index Methodology. Further, the general population of employees at the Company may be divided into cohorts for which surveys are run at specific points in time, for example, after recruitment or after onboarding. This may allow the Company to maintain an overall view on the quality and the evolution of its employee experience. Additionally, the Experience Index can be tied to business KPIs via predictive models. The purpose of this is to find KPIs that drive favorable and unfavorable experiences and construct models that relate those KPIs to the Experience Index. Given a model that predicts the Experience Index with reasonable accuracy, the results of the model can be used to evaluate the quality of the experience for all who go through the experience, not just those who take a survey. The modeling of the Experience Index also allows for proactive actions to correct a particular experience when the KPIs indicate the experience is on the verge of worsening. Several different models have been found effective in relation to the Experience Index Methodology, including, for example, a Logistic Transformed Linear Model, and a Multinomial, Multi-Label model.

Exemplary Use Case-Customer Experience

In this second exemplary use case, the XI Methodology was implemented in relation to a particular customer experience at a customer service company or contact center, which will be referred to as "Contact Center" for the sake of the example. As part of this implementation, the XI Methodology was used to better understand the customer experience as it relates to product support and, within that, study the communication cadence used by product support to reach customers. The results of the study were correlated against particular KPIs at the Contact Center, for example, Experience Index scores and aspects of communication cadence were correlated against "open case times" in product support. Particular goals of the study included improving the customer experience while also looking at ways to resolve open cases more quickly and improve business performance.

In accordance with the Experience Index Methodology, an initial phase of the study was devoted to understanding the experience, i.e., making sure that what is most important to the customer during a product support experience was understood completely. As expected, the results of this part of the study indicated that both "achieving a quick resolution" and "achieving an accurate resolution" were key experience aspects and highly rated for importance by customers. It became apparent that it would be essential to learn exactly what the "quick" in "quick resolution" meant to customer, as this would inform several decisions as to how the product support team delivered services and conducted customer communications.

In a next phase of the implementation, the experience was assessed by surveying the experience audience and calculating Experience Index scores. In the surveys, customers with product support cases were asked how well the KEAs were delivered, and their responses were used to build a model for understanding how customers perceive a "quick" resolution. As part of the analysis, classification data was associated with the survey responses so that relevant cohorts could be evaluated and compared. For example, the Experience Index scores were grouped by several data types, including case priority (as reported by the customer), resolution time, resolution adherence, containment rate, and time stamped data regarding communications between the contact center and the customer. This analysis uncovered an outlying result, which involved that an out-sized drop in Experience Index scores that occurred after a case was open longer than 17 days. From there, further analysis was performed by breaking the communication data into whether the communication was initiated by the product support team or the customer. Also, feature averages on both sides of the 17-day threshold were explored.

Several relevant observations were supported by the results obtained from this analysis. First, customer do not communicate frequently and even less frequently by real-time, voice channels. For example, the mean number of customer communications by voice channel is less than one. Second, there are many cases where the customer creates the case and is not heard from again, meaning that the mean time between client communications is nearly equal to the entire time the case is open. Third, the time between Contact Center initiated communications increases as the case takes longer to resolve. Fourth, the drop or abandon rate for cases nearly doubles for cases open longer than the 17-day threshold. Fifth, Experience Index scores for cases open less than the 17-day threshold could be predicted much more accurately than cases exceeding the threshold.

An additional observation found that a particular communication cadence by the Contact Center (i.e., the timing of communications with the customer) was surprisingly effective at reducing the number of lingering cases and cases that were eventually abandoned. For example, it was found that increasing outreach to customers just after ten days is particularly effective at ensuring all necessary information has been received or to confirm the next steps in the troubleshooting activity. By contacting the customer at this point, the number of cases that close due to no follow-up from the customer are significantly reduced while the likelihood of resolving the case before the 17-day threshold is significantly increased. It was further observed that the particular communication cadence ameliorated negative customer experiences when cases do linger. From these observations, a specific recommendation could then be made to the Product Support team regarding the timing of communications. Further, given the data analysis already done, the recommendation could include an estimate as to the amount its implementation would improve the customer experience. This anticipated improvement could then be weighed against any associated cost considerations so that an informed decision could be made toward its adoption.

XI Methodology Augmented with AI

Figure 17:
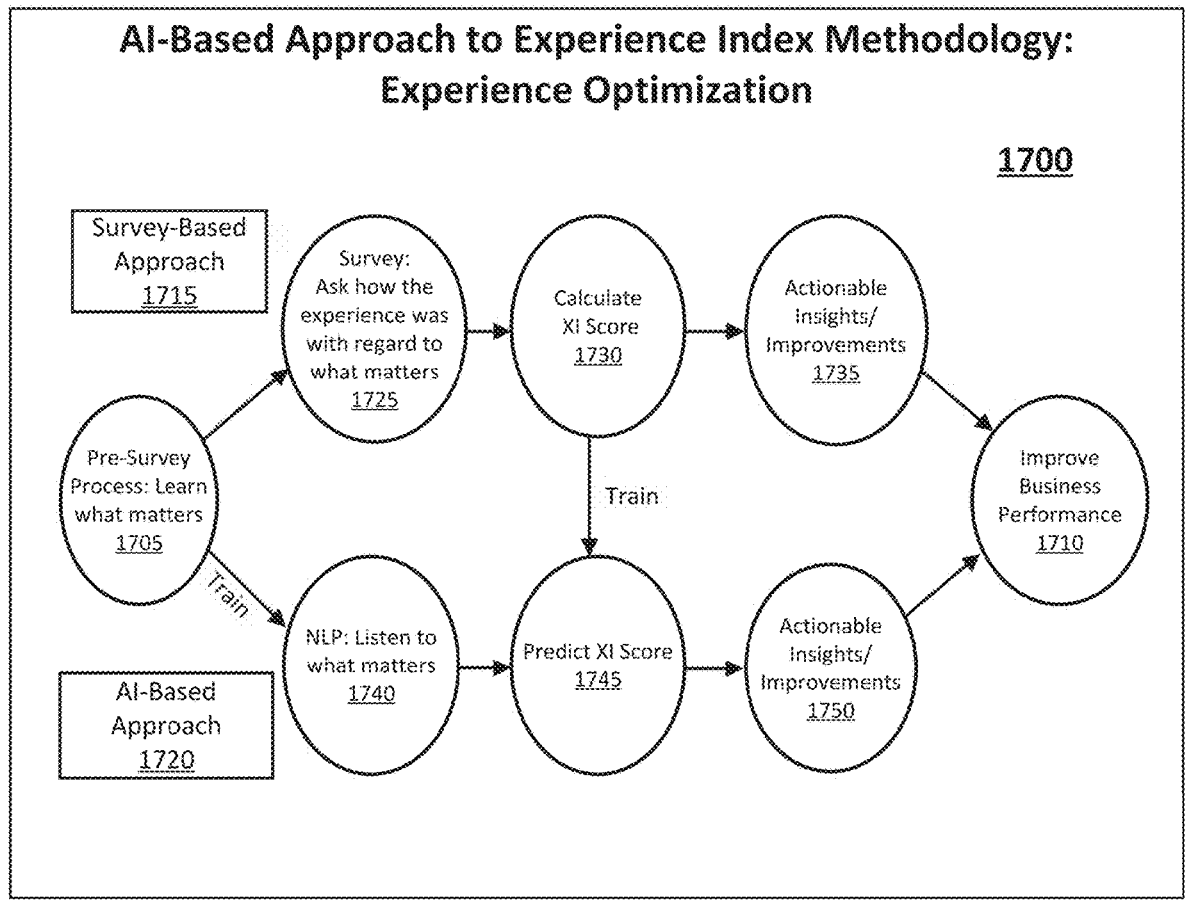
FIG. 17 is an exemplary schematic logic diagram illustrating the enhancement of the Experience Index Methodology via artificial intelligence ("AI") or machine learning.

With reference now to FIG. 17, a schematic logic diagram 1700 is provided illustrating how XI Methodology can be augmented with AI, for example, neural networks, deep learning, and/or machine learning. Such systems may further include natural language processing (or to automate the collection of datasets for analysis and model training. Accordingly, it should be understood that the present invention further includes embodiments that augment already described functionality via the implementation of one or more of the aspects that will now be explained with continued reference to logic diagram 1700.

As shown in the logic diagram 1700, two paths are indicated that extend between an initial step 1705, which is indicated on the left of the diagram and labeled "Research: Understand what matters", and an opposing final step 1710, which is positioned on the right of the diagram and labeled "Improve Business Performance". These two paths may be described as including an upper path, which is referred to herein as a Survey-Based Approach 1715, and a lower path, which is referred to herein as an AI-Based Approach 1720. Each of these will now be described.

As will be appreciated, the Survey-Based Approach 1715 generally describes the XI Methodology discussed above. That is, the research process of step 1705 generally is carried out to understand what matters about an experience, and a next step 1725 is carried out solicit feedback as part of a pre-survey process to further that understanding. At a next step 1725, an assessment survey for the experience is administered on the wider population of an experience audience to measure experience quality, i.e., calculate how the experience rates with regard to the understanding gained in the previous steps as to what matters. This result is calculated as an XI score or multiple XI scores. Then, at a step 1735, the XI scores calculated during step 1730 are correlated against KPIs, benchmarked to determine outlying cohorts, and otherwise analyzed so to identify actionable insights and, in turn, ways to improve the experience. With the improvements made to the experience, related aspects of the business's performance will likewise improve, as indicated in step 1710.

The AI-Based Approach 1720 provides a method that includes training AI and machine learning (referred to collectively hereafter as "machine learning") models to predict XI scores based on NLP inputs related to the experience being studied. For example, with the knowledge learned at step 1705 regarding "what matters", natural language inputs produced in the normal course of business can be processed via NLP systems, which would essentially be trained to listen for "what matters". Inputs from step 1740 would then be fed into a machine learning model at step 1745 that would be trained via the calculated actual XI score from step 1730 to calculate a predicted XI score. Once the model from step 1745 is sufficiently trained, predicted XI scores from step 1745 could be relied on without the need to perform the general survey. Alternatively, the general survey could be completed on less than the full population of experience receivers to at least partial confirmation as to the validity of the predicted XI score. The predicted XI score could also be used between general surveys to monitor for significant changes in the XI score. When significant changes in the XI score are predicted in step 1745, the need to conduct a general survey could be triggered. As will be appreciated, the collection of NLP data in step 1740 may include time stamps and related information regarding the persons or stakeholder involved, such as demographic information, department data, type of job, etc., so that the predicted XI scores could be calculated in a variety of ways, such as, for example, an overall company score, a score broken out for a specific department, a score for a specific job type, a score for a specific perception (i.e., a PXI score), a series of scores showing changes over time, scores for different cohorts so to identify outlying cohorts, or a score consistent with any of the other analytics already described herein. Then, at a step 1750, the predicted XI score calculated during steps 1745 are correlated against KPIs, benchmarked to determine outlying cohorts, and otherwise analyzed so to identify actionable insights and, in turn, ways to improve the experience. With the improvements made to the experience, related aspects of the business's performance will likewise improve, as indicated in step 1710.

Regarding the collection of "course of business" data for natural language processing in step 1740, it will be appreciated that this step is more feasible and convenient in certain industries, businesses, or job types. That is, while certain industries, businesses, or jobs regularly produce natural language voice and text data that can be conveniently collected and analyzed in a way that would be consistent with enabling the operation of logic flow diagram 1700, others do not. However, the collection of such data and capabilities related to its analysis is ever expanding so that the applicability of the approach described in logic flow diagram 1700 should continue to widen. As an example of an industry that already regularly collects and analyzes such data is the customer service industry, which includes contact centers and related cloud-based customer services. Contact centers regularly record and store interactions with customers for natural language processing and related analytics. Companies within this industry, thus, already have large and growing databases of conversations and written exchanges between employees (such as customer service agents) and customers. As would be appreciated by one of ordinary skill in the art, this stored information could be further mined in the manner described herein—and as indicated schematically in FIG. 17—to gain insights about the experiences being provided to both customers and employees and/or make accurate and actionable predictions as to the XI scores related to those experiences.

Exemplary Method

Figure 18:
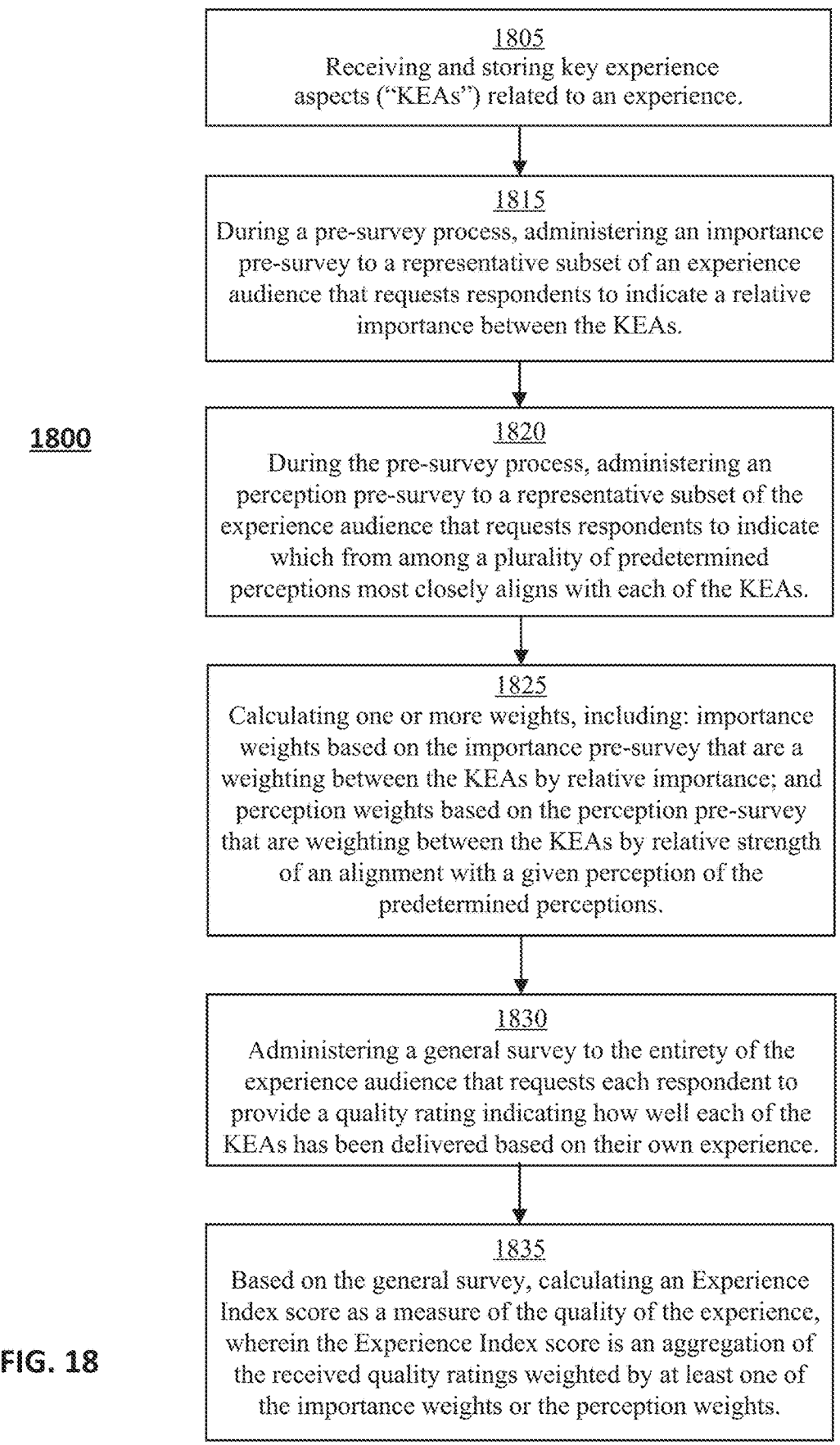
FIG. 18 is an exemplary method according to embodiments of the present invention.

With reference now to FIG. 18, a method 1800 is provided demonstrating an exemplary process by which the Experience Index Methodology may be implemented, for example, to measure and optimize an experience. In regard to terminology associated with the method 1800, it will be appreciated that an experience is provided by an "experience provider" and experienced by an "experience audience".

According to a step 1805, the method 1800 may include receiving and storing key experience aspects ("KEAs") that relate to a particular experience. As described, each of the KEAs may include a statement describing a key aspect of the experience. Note that the method 1800 is presented in a way that assumes the KEAs have already been identified. It will be appreciated that alternative embodiments may include preceding steps related to the identification of those KEAs.

According to a step 1815, the method 1800 may include performing a pre-survey process to develop an understanding of the experience. The pre-survey process may include administering electronically a set of pre-surveys. Each pre-survey of the set of pre-surveys may be administered to respondents in a representative subset of the experience audience. The set of pre-surveys may include an importance pre-survey that requests each respondent to respond by indicating a relative importance between the KEAs.

According to a step 1820, the method 1800 may include performing another pre-survey that is a perception pre-survey. The perception pre-survey may request each respondent to respond by indicating which from among a plurality of predetermined perceptions most closely aligns with each of the KEAs.

According to a step 1825, the method 1800 may include calculating, based on responses received during the administering of the set of pre-surveys, one or more weights. The one or more weights may include importance weights, which are based on responses received to the importance pre-survey. The importance weights may be a weighting between the KEAs by relative importance. The weights may further include perception weights, which are based on responses received to the perception pre-survey. The perception weights may include a weighting between the KEAs by relative strength of an alignment with a given perception of the plurality of predetermined perceptions. Each of the perceptions of the plurality of predetermined perceptions may be a word or phrase conveying a mental impression for associating with the experience According to a step 1830, the method 1800 may include performing a general survey process that includes administering electronically a general survey to an entirety of the experience audience. The general survey may request each respondent to provide a quality rating indicating how well each of the KEAs has been delivered based on their own experience of the experience.

According to a step 1835, the method 1800 may include calculating, based on responses received during the administering of the general survey, an Experience Index score as a measure of the quality of the experience. The Experience Index score may be an aggregation of the received quality ratings weighted by at least one of the importance weights or the perception weights.

According to exemplary embodiments, the method may further include the step of receiving candidate key experience aspects ("candidate KEAs"), which are narrowed to provide the KEAs. One way in which this may be done is to include a candidate KEA pre-survey in the set of pre-surveys that requests each respondent to respond by indicating a relative importance between the candidate KEAs. The KEAs then may be selected as a predetermined top number of the most important candidate KEAs based on responses of the candidate KEA pre-survey. In preferred embodiments, the number of the candidate KEAs may be between 5 and 15, and the number of the KEAs may be between 3 and 7. Further, the plurality of predetermined perceptions may include between 2 and 5 of the perceptions.

In exemplary embodiments, the calculated Experience Index scores may be the aggregation of the received quality ratings weighted by the importance weights but not the perception weights. Alternatively, the Experience Index scores may be the aggregation of the received quality ratings weighted by both the importance weights and the perception weights. Further, as described in more detail above, the Experience Index scores may be calculated as a Perception Experience Index score, which is a scores that is calculated in relation to a specific one of the perceptions selected from the plurality of predetermined perceptions.

In exemplary embodiments, the step of administering the importance pre-survey may include generating a user interface on a device of each of the respondents. The user interface may include: a display of a list of the KEAs; and functionality associated with the list of the KEAs allowing the given respondent to reorder the list of the KEAs to reflect an order of importance. An example of this type of embodiment is provided in FIG. 9.

In exemplary embodiments, the step of administering the perception pre-survey may include generating a user interface on a device of each of the respondents. For each of the KEAs, the user interface may include: a display of selection fields associated with respective ones of the perceptions; functionality associated with the selection fields allowing the given respondent to select a single perception from among the perceptions for associating with the given KEA; and a display of instructions communicating that the selection of the single perception should be based on assuming the experience succeeds in delivering the given KEA. An example of this type of embodiment is provided in FIG. 11.

In exemplary embodiments, the step of administering the general survey may include generating a user interface on a device of each of the respondents. For each of the KEAs, the user interface may include: a display of selection fields associated with respective levels of agreement, the levels of agreement including a plurality ranging between at least one level of disagreement and at least one level of agreement; functionality associated with the selection fields allowing the given respondent to select a single level of agreement from among the levels of agreement for the given KEA; and a display of instructions communicating that the selection of the single level of agreement should indicate a level of agreement with a statement regarding how well the experience provider has delivered the given KEA. An example of this type of embodiment is provided in FIG. 13.

In certain embodiments, the experience provider is a business, and the experience audience is a stakeholder associated with the business, such as employees or customers. More specifically, the business may be a contact center, and the employees may be customer service agents at the contact center.

In exemplary embodiments, the step of administering the general survey may include: determining classification data about each of the respondents, the classification data comprising a plurality of unique data types by which the experience audience can be grouped into cohorts; and associating the classification data for each respondent with the response received from the same respondent. In such cases, the Experience Index score may be calculated according to the cohorts so that an Experience Index score is calculated for each of the cohorts. The method may further include the steps of: comparing the Experience Index scores between the cohorts; and based on the comparison, identifying at least one outlier cohort from among the cohorts. When the experience audience is employees of a business, the classification data may include employment data, such as, for example, a position of employee; a department of employee; and a length of employment. When the experience audience is customers of a business, the classification data may include any type of demographic data.

According to an alternate embodiment, the one or more Experience Index scores are aggregated according to the cohorts so that an Experience Index score is calculated for each of the cohorts. The method may further include the steps of: comparing the Experience Index scores between the cohorts; correlating results of the comparison against a plurality of key performance indicators of the business to calculate a correlation strength therebetween; determining whether a calculated one of the correlation strengths exceeds a predetermined threshold; and in response to determining that the calculated one of the correlation strengths exceeds the predetermined threshold, transmitting an electronic communication to a predetermined user device to provide a notification thereof. Such notification may alert a supervisor or manager or other employee so to initiate further analysis and/or corrective action.

In conclusion, the Experience Index Methodology represents a modern, versatile approach to measuring the quality of any experience. The approach embodies the values of the experience economy, specifically because it is uniquely focused on listening and understanding people's expectations for an experience before measuring the degree to which those expectations are being satisfied. The new experience economy created a need for business to be better at measuring experience quality. The presently disclosed Experience Index Methodology meets that need and empowers companies to enhance and optimize the experiences they provided.

That which is claimed:

1. A computer-implemented method facilitating a measuring and enhancement of a quality of an experience, wherein the experience is being provided by an experience provider and experienced by an experience audience, the method comprising the steps of:
   receiving, via a computer system, and storing in a non-transitory memory medium key experience aspects ("KEAs") for the experience, each of the KEAs comprising a statement describing a key aspect of the experience;
   performing, by the computer system, a pre-survey process to develop an understanding of the experience, wherein the pre-survey process includes administering electronically a set of pre-surveys, each pre-survey of the set of pre-surveys being administered to respondents in a representative subset of the experience audience, wherein the set of pre-surveys comprises at least:
      an importance pre-survey that requests each respondent to respond by indicating a relative importance between the KEAs; and
      a perception pre-survey that requests each respondent to respond by indicating which from among a plurality of predetermined perceptions most closely aligns with each of the KEAs;
   based on responses received during the administering of the set of pre-surveys, calculating, by the computer system, one or more weights, wherein the one or more weights include at least:
      importance weights based on responses received to the importance pre-survey, the importance weights comprising a weighting between the KEAs by relative importance; and
      perception weights based on responses received to the perception pre-survey, the perception weights comprising a weighting between the KEAs by relative strength of an alignment with a given perception of the plurality of predetermined perceptions;
   performing, by the computer system, a general survey process that includes administering electronically a general survey to an entirety of the experience audience, wherein the general survey requests each respondent to provide a quality rating indicating how well the experience provider delivered each of the KEAs based on their own experience of the experience;
   based on responses received during the administering of the general survey, calculating, by the computer system, a first set of one or more Experience Index scores as measures of the quality of the experience, wherein the first set of one or more Experience Index scores comprise an aggregation of the received quality ratings weighted by at least one of the importance weights or the perception weights;
   training a machine learning model to calculate a predicted Experience Index score based on the calculated first set of one or more Experience Index scores and inputs from a trained natural language processing system; and
   based on responses received from a subsequent set of pre-surveys, predicting a second set of Experience Index scores using the trained machine learning model without administering a subsequent general survey.

2. The method of claim 1, further comprising the step of receiving candidate key experience aspects ("candidate KEAs");
   wherein the set of pre-surveys further comprises a candidate KEA pre-survey that requests each respondent to respond by indicating a relative importance between the candidate KEAs;
   further comprising the step of selecting, as the KEAs, a predetermined top number of a most important ones of the candidate KEAs based on responses of the candidate KEA pre-survey.

3. The method of claim 2, wherein:
   a number of the candidate KEAs comprises between 5 and 15; and
   a number of the KEAs comprises between 3 and 7.

4. The method of claim 1, wherein each of the perceptions of the plurality of predetermined perceptions comprises a word or phrase conveying a mental impression for associating with the experience; and wherein the plurality of predetermined perceptions comprises between 2 and 5 of the perceptions.

5. The method of claim 1, wherein the one or more Experience Index scores comprise the aggregation of the received quality ratings weighted by the importance weights but not the perception weights.

6. The method of claim 1, wherein the one or more Experience Index scores comprise the aggregation of the received quality ratings weighted by both the importance weights and the perception weights.

7. The method of claim 1, wherein the calculated one or more Experience Index scores include a Perception Experience Index score, the Perception Experience Index score comprising a type of the one or more Experience Index scores that is calculated in relation to a specific one of the perceptions selected from the plurality of predetermined perceptions.

8. The method of claim 1, wherein the step of administering the importance pre-survey comprises generating a user interface on a device of each of the respondents, wherein the user interface comprises:
  a display of a list of the KEAs; and
  functionality associated with the list of the KEAs allowing the given respondent to reorder the list of the KEAs to reflect an order of importance.

9. The method of claim 1, wherein the step of administering the perception pre-survey comprises generating a user interface on a device of each of the respondents, wherein, for each of the KEAs, the user interface includes:
  a display of selection fields associated with respective ones of the perceptions;
  functionality associated with the selection fields allowing the given respondent to select a single perception from among the perceptions for associating with the given KEA; and
  a display of instructions communicating that the selection of the single perception should be based on assuming the experience succeeds in delivering the given KEA.

10. The method of claim 1, wherein the step of administering the general survey comprises generating a user interface on a device of each of the respondents, wherein, for each of the KEAs, the user interface includes:
  a display of selection fields associated with respective levels of agreement, the levels of agreement including a plurality ranging between at least one level of disagreement and at least one level of agreement;
  functionality associated with the selection fields allowing the given respondent to select a single level of agreement from among the levels of agreement for the given KEA; and
  a display of instructions communicating that the selection of the single level of agreement should indicate a level of agreement with a statement regarding how well the experience provider has delivered the given KEA.

11. The method of claim 1, wherein the experience provider comprises a business, and the experience audience comprises one of: employees of the business; or customers of the business.

12. The method of claim 11, wherein the business comprises a contact center, and the employees comprise customer service agents.

13. The method of claim 1, wherein the step of administering the general survey comprises:
  determining classification data about each of the respondents, the classification data comprising a plurality of unique data types by which the experience audience can be grouped into cohorts; and
  associating the classification data for each respondent with the response received from the same respondent.

14. The method of claim 13, wherein the experience provider comprises a business, and the one or more Experience Index scores are aggregated according to the cohorts so that an Experience Index score is calculated for each of the cohorts;
  further comprising the steps of:
    comparing the Experience Index scores between the cohorts;
    correlating results of the comparison against a plurality of key performance indicators of the business to calculate a correlation strength therebetween;
    determining whether a calculated one of the correlation strengths exceeds a predetermined threshold; and
    in response to determining that the calculated one of the correlation strengths exceeds the predetermined threshold, transmitting an electronic communication to a predetermined user device to provide a notification thereof.

15. The method of claim 13, wherein the one or more Experience Index scores are aggregated according to the cohorts so that an Experience Index score is calculated for each of the cohorts;
  further comprising the steps of:
    comparing the Experience Index scores between the cohorts; and
    based on the comparison, identifying at least one outlier cohort from among the cohorts.

16. The method of claim 15, wherein the experience provider comprises a business, and the experience audience comprises employees of the business;
  wherein the classification data comprises employment data that includes at least: a position of employee; a department of employee; and a length of employment.

17. The method of claim 15, wherein the experience provider comprises a business, and the experience audience comprises customers of the business;
  wherein the classification data comprises demographic data and time stamps.

18. A system facilitating a measuring and enhancement of a quality of an experience, wherein the experience is being provided by an experience provider and experienced by an experience audience, the system comprising:
  a processor configured to execute instructions; and
  a non-transitory memory medium, wherein the memory stores instructions that, when executed by the processor, cause the processor to perform a process that includes the steps of:
    receiving key experience aspects ("KEAs") for the experience, each of the KEAs comprising a statement describing a key aspect of the experience;
    performing a pre-survey process to develop an understanding of the experience, wherein the pre-survey process includes administering electronically, via a survey management module, a set of pre-surveys, each pre-survey of the set of pre-surveys being administered to respondents in a representative subset of the experience audience, wherein the set of pre-surveys comprises at least:
      an importance pre-survey that requests each respondent to respond by indicating a relative importance between the KEAs; and
      a perception pre-survey that requests each respondent to respond by indicating which from among a plurality of predetermined perceptions most closely aligns with each of the KEAs;

based on responses received during the administering of the set of pre-surveys, calculating, by the processor using a weighting algorithm, one or more weights, wherein the one or more weights include at least:

importance weights based on responses received to the importance pre-survey, the importance weights comprising a weighting between the KEAs by relative importance; and perception weights based on responses received to the perception pre-survey, the perception weights comprising a weighting between the KEAs by relative strength of an alignment with a given perception of the plurality of predetermined perceptions;

performing a general survey process that includes administering electronically via the experience index module a general survey to an entirety of the experience audience, wherein the general survey requests each respondent to provide a quality rating indicating how well the experience provider delivered each of the KEAs based on their own experience of the experience;

based on responses received during the administering of the general survey, calculating by the processor using an aggregation algorithm, a first set of one or more Experience Index scores as measures of the quality of the experience, wherein the first set of one or more Experience Index scores comprise an aggregation of the received quality ratings weighted by at least one of the importance weights or the perception weights;

training a machine learning model to calculate a predicted Experience Index score based on the calculated first set of one or more Experience Index scores and inputs from a trained natural language processing system; and based on responses received from a subsequent set of pre-surveys, predicting a second set of Experience Index scores using the trained machine learning model without administering a subsequent general survey.

19. The system of claim 18, wherein each of the perceptions of the plurality of predetermined perceptions comprises a word or phrase conveying a mental impression for associating with the experience; and
wherein:
the plurality of predetermined perceptions comprises between 2 and 5 of the perceptions; and
a number of the KEAs comprises between 3 and 7.

20. The system of claim 18, wherein the step of administering the importance pre-survey comprises generating a user interface on a device of each of the respondents, wherein the user interface comprises:
a display of a list of the KEAs; and
functionality associated with the list of the KEAs allowing the given respondent to reorder the list of the KEAs to reflect an order of importance.

21. The system of claim 18, wherein the step of administering the perception pre-survey comprises generating a user interface on a device of each of the respondents, wherein, for each of the KEAs, the user interface includes:
a display of selection fields associated with respective ones of the perceptions;
functionality associated with the selection fields allowing the given respondent to select a single perception from among the perceptions for associating with the given KEA; and
a display of instructions communicating that the selection of the single perception should be based on assuming the experience succeeds in delivering the given KEA.

22. The system of claim 18, wherein the step of administering the general survey comprises generating a user interface on a device of each of the respondents, wherein, for each of the KEAs, the user interface includes:
a display of selection fields associated with respective levels of agreement, the levels of agreement including a plurality ranging between at least one level of disagreement and at least one level of agreement;
functionality associated with the selection fields allowing the given respondent to select a single level of agreement from among the levels of agreement for the given KEA; and
a display of instructions communicating that the selection of the single level of agreement should indicate a level of agreement with a statement regarding how well the experience provider has delivered the given KEA.

23. The system of claim 18, wherein the experience provider comprises a contact center, and the experience audience comprises one of: customer service agents of the contact center; or customers receiving services from the contact center.

24. The system of claim 18, wherein the step of administering the general survey comprises:
determining classification data about each of the respondents, the classification data comprising a plurality of unique data types by which the experience audience can be grouped into cohorts; and
associating the classification data for each respondent with the response received from the same respondent;
wherein:
the one or more Experience Index scores are aggregated according to the cohorts so that an Experience Index score is calculated for each of the cohorts; and
the process further comprises the steps of:
comparing the Experience Index scores between the cohorts; and
based on the comparison, identifying at least one outlier cohort from among the cohorts.

25. The system of claim 24, wherein the experience provider comprises a business, and the experience audience comprises employees of the business;
wherein the classification data comprises employment data that includes at least: a position of employee; a department of employee; and a length of employment.

26. The system of claim 24, wherein the experience provider comprises a business, and the experience audience comprises customers of the business;
wherein the classification data comprises demographic data and time stamp data.

27. The system of claim 18, wherein the step of administering the general survey comprises:
determining classification data about each of the respondents, the classification data comprising a plurality of unique data types by which the experience audience can be grouped into cohorts; and
associating the classification data for each respondent with the response received from the same respondent;
wherein:

the one or more Experience Index scores are aggregated according to the cohorts so that an Experience Index score is calculated for each of the cohorts; and the process further comprises the steps of:
- comparing the Experience Index scores between the cohorts;
- correlating results of the comparison against a plurality of key performance indicators of the business to calculate a correlation strength therebetween;
- determining whether a calculated one of the correlation strengths exceeds a predetermined threshold; and
- in response to determining that the calculated one of the correlation strengths exceeds the predetermined threshold, transmitting an electronic communication to a predetermined user device to provide a notification thereof.

* * * * *